(12) United States Patent
Ziegler et al.

(10) Patent No.: US 12,162,258 B2
(45) Date of Patent: *Dec. 10, 2024

(54) METHOD TO PRODUCE A COATING LAYER, A BUILDING PANEL AND A COATED FOIL

(71) Applicant: Välinge Innovation AB, Viken (SE)

(72) Inventors: Göran Ziegler, Viken (SE); Christer Lundblad, Örkelljunga (SE); Per Josefsson, Ramlösa (SE); Anette Hedlund, Klippan (SE)

(73) Assignee: Välinge Innovation AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,504

(22) Filed: Apr. 18, 2023

(65) Prior Publication Data

US 2023/0364901 A1 Nov. 16, 2023

Related U.S. Application Data

(63) Continuation of application No. 17/066,507, filed on Oct. 9, 2020, now Pat. No. 11,660,850, which is a
(Continued)

(30) Foreign Application Priority Data

May 23, 2017 (SE) ..................... 1750641-1

(51) Int. Cl.
*B32B 37/20* (2006.01)
*B05D 3/02* (2006.01)
(Continued)

(52) U.S. Cl.
CPC .......... *B32B 37/203* (2013.01); *B05D 3/0272* (2013.01); *B05D 3/067* (2013.01);
(Continued)

(58) Field of Classification Search
CPC ... B32B 37/203; B32B 37/1027; B32B 37/24; B32B 27/08; B32B 27/304; B32B 21/08;
(Continued)

(56) References Cited

U.S. PATENT DOCUMENTS 6,231,921 B1 5/2001 Hashemzadeh et al.
10,814,601 B2 10/2020 Ziegler et al.
(Continued)

FOREIGN PATENT DOCUMENTS

CN 106536213 A 3/2017
EP 0210620 A2 2/1987
(Continued)

OTHER PUBLICATIONS

European Search Report and Search Opinion received for European Application No. 18805075.1, mailed on Jan. 29, 2021, 11 pages.
(Continued)

*Primary Examiner* — Michael M. Bernshteyn
(74) *Attorney, Agent, or Firm* — Boone IP Law

(57) ABSTRACT

The present disclosure relates to a method to produce a coating layer, including applying a coating composition on a surface of a carrier, curing the coating composition to a coating layer, and subsequently applying pressure to the coating layer. The disclosure further relates to a method to produce a building panel, and such a building panel, and to a method to produce a coated foil, and such a coated foil.

23 Claims, 2 Drawing Sheets

Related U.S. Application Data continuation of application No. 15/987,228, filed on May 23, 2018, now Pat. No. 10,814,601.

(51) Int. Cl.

| | | |
|---|---|---|
| *B05D 3/06* | (2006.01) | |
| *B32B 21/08* | (2006.01) | |
| *B32B 27/08* | (2006.01) | |
| *B32B 27/30* | (2006.01) | |
| *B32B 37/10* | (2006.01) | |
| *B32B 37/24* | (2006.01) | |
| *B32B 38/16* | (2006.01) | |
| *B44C 1/24* | (2006.01) | |
| *B44C 5/04* | (2006.01) | |
| *B44F 1/02* | (2006.01) | |
| *C08J 7/04* | (2020.01) | |
| *C08J 7/043* | (2020.01) | |
| *C08J 7/046* | (2020.01) | |
| *C09D 167/00* | (2006.01) | |
| *C09D 175/04* | (2006.01) | |
| *C09D 175/06* | (2006.01) | |
| *E04F 15/10* | (2006.01) | |

(52) U.S. Cl.
CPC .............. *B32B 21/08* (2013.01); *B32B 27/08* (2013.01); *B32B 27/304* (2013.01); *B32B 37/1027* (2013.01); *B32B 37/24* (2013.01); *B44C 1/24* (2013.01); *B44C 5/04* (2013.01); *B44F 1/02* (2013.01); *C08J 7/0427* (2020.01); *C08J 7/043* (2020.01); *C08J 7/046* (2020.01); *C09D 167/00* (2013.01); *C09D 175/04* (2013.01); *C09D 175/06* (2013.01); *E04F 15/102* (2013.01); *E04F 15/105* (2013.01); *E04F 15/107* (2013.01); *B32B 2038/166* (2013.01); *B32B 2255/10* (2013.01); *B32B 2264/102* (2013.01); *B32B 2310/0831* (2013.01); *B32B 2375/00* (2013.01); *B32B 2419/00* (2013.01); *C08J 2327/06* (2013.01); *C08J 2375/04* (2013.01); *C08J 2467/00* (2013.01); *C08J 2475/04* (2013.01)

(58) Field of Classification Search
CPC ............ B32B 2255/10; B32B 2375/00; B32B 2419/00; B32B 2264/102; B32B 2310/0831; B32B 2038/166; B05D 3/067; C09D 167/00; C09D 175/04; C09D 175/06; E04F 15/105; E04F 15/107; E04F 15/102; C08J 7/0427; C08J 7/043; C08J 7/046; C08J 2327/06; C08J 2264/102; C08J 2475/04; C08J 2375/04
USPC ....................................................... 428/411
See application file for complete search history.

(56) References Cited

U.S. PATENT DOCUMENTS

| 2002/0038924 A1 | 4/2002 | Nilsson et al. |
|---|---|---|
| 2002/0106517 A1 | 8/2002 | Tian |
| 2010/0003523 A1 | 1/2010 | Sharygin et al. |
| 2013/0011623 A1 | 1/2013 | Jones et al. |
| 2014/0023832 A1 | 1/2014 | Pervan et al. |
| 2014/0120351 A1 | 5/2014 | Allen et al. |
| 2014/0255670 A1* | 9/2014 | Kalwa ............... B05D 7/08 427/258 |
| 2014/0370319 A1 | 12/2014 | Vetter et al. |
| 2015/0017461 A1* | 1/2015 | Lindgren ............ E04F 15/102 428/528 |
| 2016/0016390 A1* | 1/2016 | Lundblad ............ B32B 27/14 156/244.11 |
| 2016/0201324 A1 | 7/2016 | Hkansson et al. |
| 2017/0008334 A1 | 1/2017 | Hoff |
| 2017/0356130 A1* | 12/2017 | Guyot .................. B32B 5/245 |
| 2018/0339504 A1 | 11/2018 | Ziegler et al. |
| 2019/0091977 A1 | 3/2019 | Lundblad et al. |

FOREIGN PATENT DOCUMENTS

| JP | 60-092803 A | 5/1985 | |
|---|---|---|---|
| KR | 10-2015-0081272 A | 7/2015 | |
| WO | 02/28665 A1 | 4/2002 | |
| WO | 2014/014400 A1 | 1/2014 | |
| WO | 2015/002599 A1 | 1/2015 | |
| WO | 2016/114710 A1 | 7/2016 | |
| WO | WO-2016113378 A1 * | 7/2016 | ............. B32B 27/00 |

OTHER PUBLICATIONS

International Preliminary Report on Patentability received for PCT Patent Application No. PCT/SE2018/050522, mailed on Dec. 5, 2019, 9 pages.
International Search Report and Written Opinion received for PCT Patent Application No. PCT/SE2018/050522, mailed on Aug. 8, 2018, 13 pages.
Masson, F., et al., "UV-radiation curing of waterbased urethane-acrylate coatings," Progress in Organic Coatings, 2000, pp. 115-126, vol. 39, Elsevier Science S.A.
Office Action received for Chinese Patent Application No. 201880032419.1, mailed on Jan. 28, 2021, 14 pages (7 pages of English Translation and 7 pages of Original Document).
Office Action received for Chinese Patent Application No. 201880032419.1, mailed on Mar. 22, 2022, 12 pages (8 pages of English Translation and 6 pages of Original Document).
Office Action received for Chinese Patent Application No. 201880032419.1, mailed on Sep. 10, 2021, 12 pages (7 pages of English Translation and 5 pages of Original Document).
Office Action received for Korean Patent Application No. 10-2019-7036712, mailed on Dec. 22, 2022, 9 pages (5 pages of English Translation and 4 pages of Original Document).
Office Action received for Korean Patent Application No. 10-2019-7036712, mailed on Jun. 8, 2022, 29 pages (17 pages of English Translation and 12 pages of Original Document).
Office Action received for Korean Patent Application No. 10-2019-7036712, mailed on Jun. 16, 2023, 4 pages (2 pages of English Translation and 2 pages of Original Document).
Official Action and accompanying Search Report mailed in SE Patent Application No. 1750641-1, Nov. 29, 2017, PRV-Swedish Patent and Registration Office, Stockholm, SE 9 pages.

* cited by examiner

METHOD TO PRODUCE A COATING LAYER, A BUILDING PANEL AND A COATED FOIL

CROSS REFERENCE TO RELATED APPLICATIONS

The present application is a continuation of U.S. application Ser. No. 17/066,507, filed on Oct. 9, 2020, now U.S. Pat. No. 11,660,850, which is a continuation of U.S. application Ser. No. 15/987,228, filed on May 23, 2018, now U.S. Pat. No. 10,814,601, which claims the benefit of Swedish Application No. 1750641-1, filed on May 23, 2017. The entire contents of each of U.S. application Ser. No. 17/066,507, U.S. application Ser. No. 15/987,228 and Swedish Application No. 1750641-1 are hereby incorporated herein by reference in their entirety.

TECHNICAL FIELD

Embodiments of the present invention relate to a method to form a coating layer, a method to form a building panel, such a building panel, and a method to form a coated foil, such as coated foil.

TECHNICAL BACKGROUND

In recent years, so-called Luxury Vinyl Tiles and Planks (LVT), WPC (Wood Plastic Composite) and SPC (Stone Plastic Composite/Solid Polymer Core) floorings have gained increasing success. These types of floor panels usually comprise a thermoplastic core, a thermoplastic décor layer arranged on the core, a thermoplastic transparent wear resistant layer on the décor layer, and a coating applied on the wear resistant layer. The thermoplastic material is often PVC. The core may comprise fillers, such as limestone. Although often named WPC floorings, the filler in the core may for some products not be wood but, for example, limestone. The wear resistant layer is conventionally a PVC foil, for example, having a thickness of 0.2-0.7 mm. The core, the décor layer and the transparent wear resistant layer are conventionally pressed together to form the floor panel. The coating applied on the wear resistant layer after pressing is conventionally a UV curing polyurethane coating. The wear resistant layer together with the coating provide the wear resistance of the floor panel and protect the décor layer. After pressing, in a subsequent and separate step, the UV curing polyurethane coating is applied on the surface of the wear resistant layer. By applying a UV curing polyurethane coating as an uppermost layer to the floor panel, the surface of floor panels obtains a uniform gloss level, i.e., the floor panel obtains the gloss level of the coating.

Since embossing of the wear resistant layer is performed during pressing, by pressing the wear resistant layer against an embossed press plate, or similar, the coating applied after embossing may make the embossed surface of the wear resistant layer more even, such that the effect of the embossing is reduced, at least visually.

However, when subjecting floor panels to wear, it has been shown that the coating and the wear resistant layer are relatively easily worn down, or at least worn such that the appearance of the wear resistant layer is affected, such as having scratches and/or not being transparent any longer. Compared to a conventional laminate floor panel, the wear resistance of an LVT floor panel is inferior. However, LVT floors offer several advantages over, for example, laminate floors, such as deep embossing, dimensional stability related to humidity, moisture resistance and sound absorbing properties.

Improving properties, such as wear and/or scratch resistance, chemical resistance and aesthetic properties, and rationalising the manufacturing process are general desires as this flooring category further develops.

Also, other types of floorings are provided with coatings, such as UV curable polyurethane coatings. Wooden floorings are often lacquered with UV curable coatings, and the surface of the wooden flooring obtains a uniform gloss level, i.e., the gloss level of the uppermost lacquer layer. Improving properties of the coating in order to allow for increasing design variations of wooden floorings would be an advantage.

WO 2016/113378 discloses a method for producing a covering, including producing a substrate layer, attaching a surface layer to a top side of the substrate layer, attaching a top side of a backing layer to a bottom side of the substrate layer and attaching a top side of a textile layer to the bottom side of the backing layer. Thereby, a sheet is provided, defined as the entirety of the surface layer, the substrate layer, the backing layer and the textile layer. In a further step, the sheet is cured. After curing the sheet, the surface layer may be mechanically embossed. After curing of the sheet, in a further step, a surface coating may be provided on top of the wear layer as an additional component of the surface layer.

US 2014/0255670 discloses a method for printing a wood material board. The method includes printing a wood material by means of a digital printing technology, forming a decorative layer, applying a protective layer containing at least one resin, at least one radiation-curable varnish and/or at least on polyurethane on the decorative layer, and pre-drying and/or pre-gelling the protective layer. The protective layer is only pre-dried and/or pre-gelled and is thus not yet completely dried or cured. The surface of the protective layer is rather sticky or surface-dried. The pre-drying and/or pre-gelling is carried out to the extent that the protectively layer, i.e., the resin or varnish as such is still free-flowing and cross-linkable. The wood material board printed and provided with the protective layer is processed further or finished in a short cycle press. In the short-cycle press, the resins layers are fused and the layer composite is cured to form a laminate.

US 2013/0011623 discloses a monolithic three-dimensional composite. The composite comprises in one embodiment a three-dimensional layer and an outer layer. A print layer can be disposed on the outer layer. The print layer may receive a wear layer by a coating means applying a polymeric composition. The wear layer is allowed to cure. A heat source, e.g., radiant oven, gas-fired oven, etc., may be employed to assist in curing the wear layer. During and/or after curing, the wear layer is permitted to obtain ambient temperature. Thereafter, the surface of the wear layer is subjected to a sufficient temperature to soften the cured wear layer surface by reheating with heat source, e.g., an infrared radiant heat oven. This step softens the surface of the wear layer to permit mechanical embossing by an embossing drum.

SUMMARY

It is an object of at least embodiments of the present invention to provide an improvement over an aspect of the above described techniques and known art.

A further object of at least embodiments of the present invention is to improve a coating process for substrates intended to be pressed.

A further object of at least embodiments of the present invention is to improve chemical resistance of coatings for flooring surfaces.

A further object of at least embodiments of the present invention is to allow varying gloss levels on coatings.

At least some of these and other objects and advantages that will be apparent from the description have been achieved by a method to produce a coating layer according to a first aspect of the invention. The method comprises applying a coating composition on a surface of a carrier, curing the coating composition to a coating layer, and subsequently applying pressure to the coating layer.

By curing is meant completely curing or at least curing beyond a pre-dried or pre-cured state.

An advantage of at least embodiments of the present invention is that by applying the coating layer prior to pressing, the coating may be performed inline, integrated with the assembling and adhering of other layers in, for example, a building panel. Thereby, a more rational and integrated production method may be achieved.

At least embodiments of the present invention allow that the coating layer may be handled as a separate layer after curing, and be adhered to another substrate, etc., by pressing. The coating composition may be applied to a substrate in form of a release foil or film, and released from the release foil or film prior to pressing the coating layer to another substrate.

A further advantage is that improved chemical resistance has shown to be achieved by pressing the coating layer. The improved chemical resistance is believed to be achieved by the fact that the pressing further increases the degree of crosslinking and/or by the compression of the coating layer. By the higher degree of crosslinking, the higher chemical resistance of the coating.

Furthermore, improved scratch resistance of the coating layer may be achieved, due to the higher degree of crosslinking obtained after pressing, and/or due to the fact that the coating layer is compressed by the pressing operation.

A further advantage is that by pressing the coating layer, also the coating layer may be embossed by pressing against an embossed press plate. In a conventional process, the surface of the substrate is embossed prior to the coating is applied. Thereby, the coating may fill less deep structures in the substrate and the visual impression of the embossing may be less distinguishable.

It has further been shown that pressing the coating layer may reduce any damages, such as scratches, in the coating layer. Such scratches may be formed during the production and during handling under the production process.

Applying pressure may comprise pressing the coating layer against a pressing device comprising portions having different gloss levels, such that the coating layer obtains different gloss levels after pressing. By applying the coating composition prior to pressing and thereafter pressing against a pressing device having portions with different gloss levels, it is possible to obtain different gloss levels in the coating layer in a simplified way compared to solutions known in the art.

Applying pressure may comprise applying heat and pressure simultaneously.

The coating composition may comprise a cross-linkable component. In a cross-linkable coating system, curing the coating composition crosslinks the polymer.

The coating composition may have a residual oligomer content being less than 10% after curing, e.g., more than 0% and less than 10%. Having some residual oligomer content corresponds with having some remaining crosslinking capacity. By some crosslinking capacity of the coating composition remaining after curing, the remaining crosslinking capacity facilitates that the coating layer may be pressed after curing.

After curing the coating composition, the coating composition is no longer sticky. Thereby, the coated carrier may be handled, such as being rolled on a roller. By curing is meant that the coating composition has passed its pre-dried and/or pre-gelled state, e.g., having a residual oligomer content being less than 10%.

The coating composition may be water-based. It has been found that a water based coating composition maintains capability to be re-shaped after curing, thus facilitating the coating layer to be shaped during pressing, for example, be embossed or be provided with a gloss level.

The coating composition may comprise a two-component system. The two-component system may comprise an epoxy amine, a polyurethane isocyanate, an isocyanate alcohol, or an acid alcohol system. The coating composition may be a water-based two-component system.

The coating composition may be UV-curable, preferably a water-based UV curable coating composition. By the coating composition being UV-curable is meant that at least a component of the coating composition is UV-curable. By using a UV curable composition, curing may be performed at a higher speed compared to pure water-based coating systems. After curing, a UV-cured coating layer is no longer sticky at room temperature, e.g., at 25° C. The surface of the coating may be harder compared to a sintered coating composition. The UV curable component may be a polyester/polyurethane dispersion. The UV curable component may be a polyurethane/acrylic copolymer dispersion.

Prior to pressing, a water-based UV-curable coating composition is first completely dried in order to have the water to evaporate, and thereafter UV-cured, such that UV-curable components are cured. After being dried and UV-cured, the coating layer formed by the coating composition is pressed.

The carrier may comprise a thermoplastic material, preferably PVC.

The carrier may be a foil. The coating layer and the carrier may be pressed together to another substrate, or the coating layer may be released from the carrier after pressing.

The foil may be a thermoplastic foil. The foil may be a PVC foil. The thermoplastic foil may be a wear resistant foil. The thermoplastic foil may be a decorative thermoplastic foil, such as a printed thermoplastic foil. Thereby, a coated thermoplastic foil may be formed, which may be pressed to a substrate in subsequent step. Since the coating layer is cured and pressed, the coated wear resistant or decorative foil may be stored and handled as a conventional wear resistant foil.

The carrier may be a wood-based substrate, preferably wood veneer. In one embodiment, a wood-based substrate is coated and thereafter pressed. Thereby, the coating layer may, for example, obtain an embossed structure by pressing against an embossed pressing device, and/or obtain different gloss levels by pressing against a pressing device having portions with different gloss levels.

Applying pressure to the coating layer may comprise pressing and attaching the coating layer on the carrier to a substrate, wherein the carrier is intermediate the coating layer and the substrate. Thereby, a coated substrate, for example a building panel, may be provided, comprising a substrate and the coated carrier. The carrier may be a thermoplastic foil. The carrier may be a wood-based material. The carrier is already provided with the coating layer prior to being adhered to the substrate. Thereby, the carrier may be coated in process separate from handling the complete substrate.

As an alternative or complement, the carrier may be adhered to the substrate by an adhesive.

The method may further comprise releasing the coating layer from the carrier prior to applying pressure, and wherein applying pressure to the coating layer comprises pressing and attaching the coating layer to a substrate. In this embodiment, the carrier has the function of a temporary carrier, for example, a release film or foil, and the coating layer may be pressed to a substrate without the carrier. Alternatively, the coating layer may be released from the carrier after pressing but prior to being adhered to a substrate.

The coating composition may comprise scratch resistant particles, such as silica particles. Thereby, the scratch resistance of the coating layer can be improved. The coating composition may also include wear resistant particles, such as aluminium oxide particles, also known as corundum.

The carrier may comprise a first thermoplastic foil and a second thermoplastic foil, wherein wear resistant particles, preferably aluminium oxide particles, are arranged between the first and the second foil. The first and second foils, with the wear resistant particles therebetween, may be prepressed to be adhered to each other, preferably after the coating has been applied. Thereby, the coated carrier forms a wear resistant layer, which can be stored and handled as a separate layer, which may be pressed to a substrate in a subsequent step.

The coating layer may be substantially transparent. The coating layer may be a layer conventionally referred to as a lacquer layer.

According to a second aspect of the present invention, a method to produce a building panel is provided. The method comprises providing a substrate and at least one surface layer arranged on the substrate, applying a coating composition on said at least one surface layer, curing the coating composition such that a coating layer is formed on said at least one surface layer, subsequently applying pressure to the coating layer with a pressing device, and pressing the substrate and the coated surface layer together to form a building panel.

Pressing the coated surface layer to the substrate may be performed separate from applying the coating composition and curing the coating composition to a coating layer. The coated surface layer may be stored, and pressed to the surface layer in a later step, which may be performed by another producer than the producer of the coated surface layer.

By curing is meant completely curing or at least curing beyond a pre-dried or pre-cured state. An advantage of at least embodiments of the present invention is that by applying the coating layer prior to pressing, the coating may be performed inline, integrated with the assembling and adhering other layer in the building panel. Thereby, a more rational and integrated production method may be achieved.

At least embodiments of the present invention allow that the coated surface layer may be handled as a separate layer after curing, and be adhered to a substrate in subsequent step, separate from the coating step.

A further advantage is that improved chemical resistance has shown to be achieved by pressing the coating layer. Thereby, a building panel having improved chemical resistance may be provided. The improved chemical resistance is believed to be achieved by the fact that the pressing further increases the degree of crosslinking, and/or by the compression of the coating layer. By the higher degree of crosslinking, the higher chemical resistance of the coating.

Furthermore, improved scratch resistance of the coating layer may be achieved, due to the higher degree of crosslinking obtained after pressing, and/or due to the fact that the coating layer is compressed by the pressing operation.

A further advantage is that by pressing the coating layer, also the coating layer may be embossed by pressing against an embossed press plate. In a conventional process, the surface of the substrate is embossed prior to the coating is applied. Thereby, the coating may fill less deep structures in the substrate and the visual impression of the embossing may be less distinguishable.

It has further been shown that pressing the coating layer may reduce any damages, such as scratches, in the surface of the substrate. Such scratches may be formed during the production and during handling under the production process.

Applying pressure may comprise pressing the coating composition against a pressing device comprising portions having different gloss levels, such that the coating layer obtains different gloss levels after pressing. By applying the coating composition prior to pressing and thereafter pressing against a pressing device having portions with different gloss levels, it is possible to obtain different gloss levels in the coating layer in a simplified way compared to solutions known in the art.

Applying pressure to the coating layer with the pressing device may comprise applying heat and pressure simultaneously.

Applying pressure to the coating layer with the pressing device may comprise bonding the substrate, said at least on one surface layer and the coating composition together.

The coating composition may comprise a cross-linkable component. In a cross-linkable coating system, curing the coating composition crosslinks the polymer.

The coating composition may comprise a residual oligomer content of less than 10% after curing Having some residual oligomer content corresponds with having some remaining crosslinking capacity. By some crosslinking capacity of the coating composition remaining after curing, the remaining crosslinking capacity facilitating that the coating layer may be pressed after curing.

After curing the coating composition, e.g., such that the residual oligomer content is less than 10%, the coating composition is no longer sticky. Thereby, the coated carrier may be handled, such as being rolled on a roller. By curing is meant that the coating composition has passed its pre-dried and/or pre-gelled state, e.g., having a residual oligomer content being less than 10%.

The coating composition may be water-based. It has been discovered that a water based coating composition maintains capability to be re-shaped after curing, thus facilitating the coating layer to be shaped during pressing, for example, be embossed or be provided with a gloss level.

The coating composition may comprise a two-component system. The two-component system may comprise an epoxy amine, a polyurethane isocyanate, an isocyanate alcohol, or an acid alcohol system. The coating composition may be epoxy amine, polyurethane isocyanate, isocyanate alcohol, acid alcohol system. The coating composition may be a water-based two-component system.

The coating composition may be UV-curable, preferably a water-based UV curable coating composition. By the coating composition being UV-curable is meant that at least a component of the coating composition is UV-curable. By using a UV curable composition, curing may be performed at a higher speed compared to pure water-based coating systems. During pressing, a cured UV cured coating layer does not stick to the press plate. The surface of the coating may be harder compared to a sintered coating composition. The UV curable component may be a polyester/polyurethane dispersion. The UV curable component may be a polyurethane/acrylic copolymer dispersion.

Prior to pressing, a water-based UV-curable coating composition is first completely dried in order to have the water to evaporate, and thereafter UV-cured, such that UV-curable components are cured. After being dried and UV-cured, the coating layer formed by the coating composition is pressed.

Said at least one surface layer may comprise a thermoplastic material, preferably PVC.

Said at least one surface layer may comprise a foil.

Said at least one surface layer may comprise a thermoplastic foil. The thermoplastic foil may be PVC foil. The thermoplastic foil may be a wear resistant foil. The thermoplastic foil may be a decorative thermoplastic foil, such as a printed thermoplastic foil. Thereby, a coated thermoplastic foil may be formed, which may be pressed to a substrate in subsequent step. Since the coating layer is cured and pressed, the coated wear resistant or decorative foil may be stored and handled as a conventional wear resistant foil.

Said at least one surface layer may comprise a wood-based substrate, preferably wood veneer. In one embodiment, a wood-based substrate is coated and thereafter pressed. Thereby, the coating layer may, for example, obtain an embossed structure by pressing against an embossed pressing device, and/or obtain different gloss levels by pressing against a pressing device having portions with different gloss levels.

Said at least one surface layer may comprise a paper, such as a decorative paper.

The coating composition may comprise scratch resistant particles, such as silica particles. Thereby, the wear resistance of the coating layer can be improved. The coating composition may also include wear resistant particles, such as aluminium oxide particles, also known as corundum.

Said at least one surface layer may comprise a first thermoplastic foil and a second thermoplastic foil, wherein wear resistant particles, preferably aluminium oxide particles, are arranged between the first and the second foil. The first and second foils, with the wear resistant particles therebetween, may be pre-pressed to be adhered to each other, prior or after the coating composition has been applied. Thereby, the coated surface layer forms a wear resistant layer, which can be stored and handled as a separate layer, which may be pressed to a substrate in a subsequent step.

The coating layer may be substantially transparent. The coating layer may be a layer conventionally referred to as a lacquer layer.

The substrate may comprise a plastic board, such as a thermoplastic board. The substrate may comprise a wood-based board. The wood-based board may be or comprise a wood veneer. The wood-based board may be or further comprise a wood fibre based board, such as MDF, HDF, particleboard etc., or a plywood board. The substrate may comprise or further comprise a wooden board, such as a lamella core. In embodiments, the substrate may comprise or further comprise thermoplastic board, for example a Wood Plastic Composite (WPC), EPC (Expanded Polymer Core), or SPC (Stone Plastic Composite/Solid Polymer Core). The substrate may comprise or further comprise a mineral composite board. The substrate may comprise or further comprise a fibre cement board.

The substrate may comprise or further comprise magnesium oxide cement board. The substrate may comprise or further comprise a ceramic board.

The substrate may comprise a paper or non-woven. The substrate may be a printed paper. The substrate may comprise a laminate comprising a thermosetting resin.

In one embodiment, the carrier comprises a thermoplastic material and the substrate comprises a thermoplastic material of the above described type.

In one embodiment, the carrier comprises a thermoplastic material and the substrate comprises a veneer. The veneer may be arranged on a board of the above described type.

In one embodiment, the carrier comprises a thermoplastic material and the substrate comprises a paper. The paper may be arranged on a board of the above described type.

In one embodiment, the carrier comprises a thermoplastic material and the substrate is formed of a powder mix comprising a binder and fillers. The substrate may be arranged on a board of the above described type. The board may be a water-resistant board.

According to a third aspect, a building panel is provided. The building panel comprises a substrate and at least one surface layer arranged on the surface layer, wherein an uppermost surface layer is provided with a cured coating layer.

The cured coating layer may comprise different gloss levels. The different gloss levels may be obtained by a pressing device after curing the coating layer.

The cured coating layer may comprise an embossed structure. The embossed structure may be obtained by a pressing device after curing the coating layer.

Embodiments of the third aspect may incorporate all the advantages of the second aspect, which previously has been discussed, whereby the previous discussion is applicable also for the building panel.

The coating layer may be cross-linked. The coating layer may comprise a cross-linkable component. In a cross-linkable coating system, curing the coating composition cross-links the polymer.

The coating layer may be water-based, preferably a water-based UV curable coating composition. It has been discovered that a water based coating composition maintains capability to be re-shaped after curing, thus facilitating the coating layer to be shaped during pressing, for example, be embossed or be provided with a gloss level.

The coating layer may comprise a two-component system. The two component system may be an epoxy amine, a polyurethane isocyanate, an isocyanate alcohol, or an acid alcohol system. The coating composition may be an epoxy amine, a polyurethane isocyanate, an isocyanate alcohol, or an acid alcohol system. The coating layer may be a water-based two-component system.

The coating layer may be UV-cured, preferably be a water-based UV cured coating layer. By the coating layer being UV-cured is meant that at least a component of the coating composition is UV-cured. By using a UV curable composition, curing may be performed at a higher speed compared to pure water-based coating systems. During pressing, a cured UV cured coating layer does not stick to the press plate. The surface of the coating may be harder compared to a sintered coating composition. The UV cured component may be a polyester/polyurethane dispersion. The UV cured component may be a polyurethane/acrylic copolymer dispersion.

Said at least one surface layer may comprise a thermoplastic material, preferably PVC.

Said at least one surface layer may comprise a foil.

Said at least one surface layer may comprise a thermoplastic foil. The thermoplastic foil may be a PVC foil. The thermoplastic foil may be a wear resistant foil. The thermoplastic foil may be a decorative thermoplastic foil, such as a printed thermoplastic foil.

The surface layer may be a wood-based substrate, preferably wood veneer. In one embodiment, a wood-based substrate is coated and thereafter pressed. Thereby, the coating layer may, for example, be provided an embossed structure by pressing against an embossed pressing device, and/or obtain different gloss levels by pressing against a pressing device having portions with different gloss levels.

The coating layer may comprise scratch resistant particles, such as silica particles. Thereby, the scratch resistance of the coating layer can be improved. The coating layer may also include wear resistant particles, preferably aluminium oxide particles, also known as corundum.

Said at least one surface layer may comprise a first thermoplastic foil and a second thermoplastic foil, wherein wear resistant particles, such as aluminium oxide particles, are arranged between the first and the second foil.

The coating layer may be substantially transparent. The coating layer may be a layer conventionally referred to as a lacquer layer.

The substrate may comprise a plastic board, such as a thermoplastic board. The substrate may comprise a wood-based board. The wood-based board may be or comprise a wood veneer. The wood-based board may be or comprise a wood fibre based board, such as MDF, HDF, particleboard, etc., or a plywood board. The substrate may comprise or further comprise a wooden board, such as a lamella core. In embodiments, the substrate may comprise or further comprise a thermoplastic board, for example a Wood Plastic Composite (WPC), Expanded Polymer Core (EPC), Stone Plastic Composite (SPC), or Solid Polymer Core (SPC). The substrate may comprise or further comprise a mineral composite board. The substrate may comprise or further comprise a fibre cement board. The substrate may be magnesium oxide cement board. The substrate may comprise or further comprise a ceramic board.

The substrate may comprise a paper or non-woven. The substrate may be a printed paper. The substrate may be formed of a powder mix comprising a binder and filler pressed to a surface layer.

According to a fourth aspect, a coated foil is provided. The coated foil comprises a carrier and a cured coating layer arranged on a surface of the carrier.

The cured coating layer may comprise an embossed structure. The embossed structure may be obtained by a pressing device after curing.

The cured coating layer may comprise different gloss levels. The different gloss levels may be obtained by a pressing device after curing.

Embodiments of the fourth aspect of the present invention incorporates all the advantages of the first aspect of the invention, which previously has been discussed, whereby the previous discussion is applicable also for the coated foil.

The coating layer may be cross-linked.

The coating layer may be a UV-cured coating layer, preferably a water-based UV cured coating layer. By the coating layer being UV-cured is meant that at least a component of the coating composition is UV-cured. By using a UV curable composition, curing may be performed at a higher speed compared to pure water-based coating systems. During pressing, a cured UV cured coating layer does not stick to the press plate. The surface of the coating may be harder compared to a sintered coating composition. The UV cured component may be a polyester/polyurethane dispersion. The UV cured component may be a polyurethane/acrylic copolymer dispersion.

The coating layer may comprise a two-component system. The coating layer may comprise an epoxy amine, a polyurethane isocyanate, an isocyanate alcohol, or an acid alcohol system. The coating layer may be a water-based two-component system.

The carrier may comprise thermoplastic material. The carrier may be a foil, such as a thermoplastic foil.

The coating layer may comprise scratch resistant particles, such as silica particles. Thereby, the scratch resistance of the coating layer can be further improved. The coating layer may also include wear resistant particles, such as aluminium oxide particles, also known as corundum.

The carrier may comprise a first thermoplastic foil and a second thermoplastic foil with wear resistant particles arranged therebetween.

The coating layer may be substantially transparent. The coating layer may be a layer conventionally referred to as a lacquer layer.

The coating layer may comprise portions having different gloss levels.

According to a fifth aspect, a method to produce a coated foil is provided. The method comprises providing a first thermoplastic foil and a second thermoplastic foil, applying wear resistant particles on the first thermoplastic foil or on a second thermoplastic foil, applying the second thermoplastic foil on the first thermoplastic foil such that wear resistant particles are arranged between the first and second thermoplastic foil, applying a coating composition on the second thermoplastic foil, curing the coating composition such that a coating layer is formed, and subsequently applying pressure to the coating layer.

The coating is applied on a surface of the second foil facing away from the wear resistant particles.

By curing is meant completely curing or at least curing beyond a pre-dried or pre-cured state.

An advantage of at least embodiments of the present invention is that by applying the coating layer prior to pressing, the coating may be performed inline, integrated with the assembling and adhering to other layers in, for example, a building panel. Thereby, a foil that is already coated may be provided, requiring no additional surface treatment after the foil has been adhered to a substrate.

At least embodiments of the present invention allow that the coating layer may be handled as a separate layer after curing, and be adhered to another substrate, etc., by pressing in a later operation.

A further advantage is that improved chemical resistance has shown to be achieved by pressing the coating layer. The improved chemical resistance is believed to be achieved by the fact that the pressing further increases the degree of crosslinking and/or by the compression of the coating layer. By the higher degree of crosslinking, the higher chemical resistance of the coating.

Furthermore, improved scratch resistance of the coating layer may be achieved, due to the higher degree of crosslinking obtained after pressing, and/or due to the fact that the coating layer is compressed by the pressing operation.

A further advantage is that by pressing the coating layer, also the coating layer may be embossed by pressing against an embossed press plate. In a conventional process, the surface of the substrate is embossed prior to the coating is applied. Thereby, the coating may fill less deep structures in the substrate and the visual impression of the embossing may be less distinguishable.

By including wear resistant particles between the first and second foils, the scratch resistant properties of the foils are improved, such that a coated foil having improved wear resistance is provided.

It has further been shown that pressing the coating layer may reduce any damages, such as scratches in the coating layer. Such scratches may be formed during the production and during handling under the production process.

Applying pressure may comprise pressing the coating layer against a pressing device comprising portions having different gloss levels, such that the coating layer obtains different gloss levels after pressing. By applying the coating composition prior to pressing and thereafter pressing against a pressing device having portions with different gloss levels, it is possible to obtain different gloss levels in the coating layer in a simplified way compared to solutions known in the art.

The coating composition may comprise scratch resistant particles, such as silica particles. Thereby, the scratch resistance of the coating layer can be further improved. The coating composition may also include wear resistant particles, such as aluminium oxide particles, also known as corundum.

The coating composition may comprise a cross-linkable component. In a cross-linkable coating system, curing the coating composition crosslinks the polymer.

The coating composition may have a residual oligomer content of less than 10% after curing. Having some residual oligomer content corresponds with having some remaining crosslinking capacity. By some crosslinking capacity of the coating composition remaining after curing, the remaining crosslinking capacity allows that the coating layer may be pressed after curing.

After curing the coating composition, the coating composition is no longer sticky. Thereby, the coated carrier may be handled, such as being rolled on a roller. By curing is meant that the coating composition has passed its pre-dried and/or pre-gelled stadium.

The coating composition may be water-based, preferably a water-based UV curable coating composition. It has been discovered that a water based coating composition maintains capability to be re-shaped after curing, thus facilitating the coating layer to be shaped during pressing, for example, be embossed or be provided with a gloss level.

The coating composition may comprise a two-component system. The coating composition may be an epoxy amine, a polyurethane isocyanate, an isocyanate alcohol, or an acid alcohol system. The coating composition may be an epoxy amine, a polyurethane isocyanate, an isocyanate alcohol, or an acid alcohol system. The coating composition may be a water-based two-component system.

The coating composition may be UV-curable, preferably a water-based UV curable coating composition. By the coating composition being UV-curable is meant that at least a component of the coating composition is UV-curable. By using a UV curable composition, curing may be performed at a higher speed compared to pure water-based coating systems. During pressing, a cured UV cured coating layer does not stick to the press plate. The surface of the coating may be harder compared to a sintered coating composition. The UV curable component may be a polyester/polyurethane dispersion. The UV curable component may be a polyurethane/acrylic copolymer dispersion.

Applying pressure to the coating layer may comprise pressing and attaching the coating layer on the coated foil to a substrate. Thereby, a coated substrate, for example a building panel, may be provided, comprising a substrate and the coated foil. The coated foil may already be provided with the coating layer prior to being adhered to the substrate. Thereby, the coated foil may be coated in process separate from handling the complete substrate.

The method may comprise applying pressure to the first and second foil prior to attaching the coated foil to the substrate, to adhere the first and second foil to each other. This pre-pressing step may be performed prior or after applying the coating composition.

The coating layer may be substantially transparent. The coating layer may be a layer conventionally referred to as a lacquer layer.

The coating layer may comprise portions having different gloss levels.

According to a sixth aspect, a coated foil is provided. The coated foil comprises a first thermoplastic foil and a second thermoplastic foil with wear resistant particles arranged therebetween, wherein coating layer is arranged on a surface of the first thermoplastic foil facing away from the second thermoplastic foil.

The coating layer may comprise different gloss levels obtained by a pressing device.

The coating layer may comprise an embossed structure obtained by a pressing device.

Embodiments of the sixth aspect of the present invention incorporates all the advantages of the fifth aspect of the invention, which previously has been discussed, whereby the previous discussion is applicable also for the coated foil.

The coating layer may be cross-linked.

The coating layer may be a UV-cured coating layer, preferably a water-based UV cured coating layer.

The coating layer may comprise scratch resistant particles, such as silica particles. Thereby, the scratch resistance of the coating layer can be further improved. The coating layer may also include wear resistant particles, such as aluminium oxide particles, also known as corundum.

The coating layer may be substantially transparent. The coating layer may be a layer conventionally referred to as a lacquer layer.

BRIEF DESCRIPTION OF THE DRAWINGS

The present invention will by way of example be described in more detail with reference to the appended schematic drawings, which show embodiments of the present invention.

DETAILED DESCRIPTION

Figure 1A:
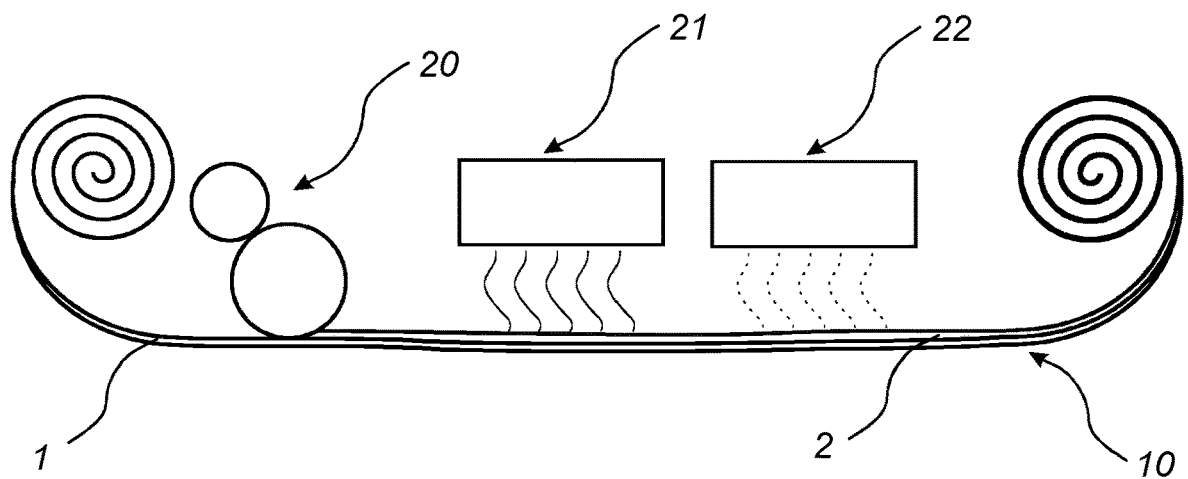
FIG. 1A shows a method to produce a coated carrier.

FIG. 1A shows a method to produce a coated carrier 10. A carrier 1 is provided. The carrier 1 may be a release foil, for example a fluoroplastic foil, or a permanent carrier, such as a thermoplastic foil. The thermoplastic foil may comprise, for example, polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt. The carrier 1 may have thickness of 0.05-1 mm. The thermoplastic foil may be printed and/or pigmented such that the thermoplastic foil forms a decorative foil.

In one embodiment, the carrier 1 is a wood veneer layer. The wood veneer layer may have a thickness of about 0.2 to 1 mm. The wood veneer may be made of any type of wood veneer. In one embodiment, the wood veneer layer is an oak veneer layer.

A coating composition is applied on a surface of the carrier 1 by a coating device 20. The coating composition may be that being traditionally referred to as a lacquer. The coating composition may be applied by roller coating, curtain coating, spraying, dip coating, etc.

The coating composition may be cross-linkable. The coating composition may be radiation curable, preferably UV curable. The coating composition is preferably water-based, such as a UV curable water-based composition. The water-based UV curable composition may comprise a polyester/polyurethane dispersion. The water-based UV curable composition may comprise a polyurethane/acrylic copolymer dispersion. The water-based UV-curable composition may further comprise a photoinitiator, thickener agent, additives, etc.

The coating composition may be a two-component system, such as an epoxy amine system, polyurethane isocyanate system, isocyanate alcohol system, acid alcohol system, etc.

The coating composition may be applied in one or several layers. The total amount of the coating composition applied, converted to the amount corresponding to 100% coating component and 0% water and solvent, may be 5-200 g/m2, such as exceeding 5 g/m2, preferably exceeding 10 g/m2.

The coating composition may comprise wear resistant particles and/or scratch resistant particles. Preferably, the coating composition comprises scratch resistant particles. Alternatively, or as a complement, scratch resistant particles may be applied on the coating composition when on the carrier and when the coating composition still is wet.

The wear resistant particles may be aluminium oxide particles, such as corundum. Alternatively, or as a complement, the wear resistant particles may be carborundum, quartz, silica, glass, glass beads, glass spheres, diamond particles, hard plastics, reinforced polymers and organics, or a combination thereof.

The wear resistant particles preferably have an average particle size within the range of 10-200 μm, preferably within the range of 50-120 μm, such as 50-100 am. The wear resistant particles may have a spherical shape or an irregular shape. The wear resistant particles may be surface treated. The wear resistant particles may be silane-treated particles. The wear resistant particles may be applied in an amount of 10-100 g/m2, preferably in an amount of 10-50 g/m2, more preferably in an amount of 20-30 g/m2.

The scratch resistant particles may be or comprise nano-sized silica particles, preferably fused silica particles. The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-100 μm, preferably 10-50 μm, more preferably 20-30 μm. The scratch resistant particles may have an average particle size of less than 50 μm, preferably less than 45 μm. The scratch resistant particles may be applied in an amount of 0.5-20 g/m2, preferably in an amount of 0.5-10 g/m2, more preferably in an amount of 0.5-5 g/m2.

The coating composition may comprise conventional additives. The coating composition may further comprise functional additives, such as anti-stat additives and/or anti-bacterial additives.

The coating composition may be transparent. However, the coating composition may also be pigmented.

The coating composition may be applied as one or several layers forming a coating on the carrier 1.

After the coating composition has been applied on the carrier 1, the coating composition is cured such that a coating layer 2 is formed. If the coating composition is UV curable, UV radiation is applied to cure the coating composition. If the coating composition is water-based UV curable coating composition, the coating composition is first dried in a drying device 21 by IR or in an oven and thereafter is cured by applying UV radiation to the coating in a UV radiation device 22. If the coating composition is a two-component system, the coating composition is dried, for example, in an oven or in room temperature (not shown).

After curing, a coated carrier 10 is formed.

Preferably, some crosslinking capacity of the coating composition remains after curing. The coating composition may have a residual oligomer content of less than 10% after curing. Having some residual oligomer content corresponds with having some remaining crosslinking capacity. Thereby, during pressing in a subsequent step, the coating composition may be further crosslinked and/or compressed.

The coated carrier 10 formed by the method described with reference to FIG. 1A may be stored after the coating composition has been cured. As will be further described with reference to FIGS. 1B and 1C, the coated carrier 10 may be applied to a substrate, or wherein the carrier is a release foil, the coating layer 2 may be applied to a substrate without the carrier 1. The coated carrier 10 may be intended to be used as coated wear resistant foil. In one embodiment, wherein the carrier is decorative thermoplastic foil, the coated carrier 10 may be a coated decorative foil.

Figure 1B:
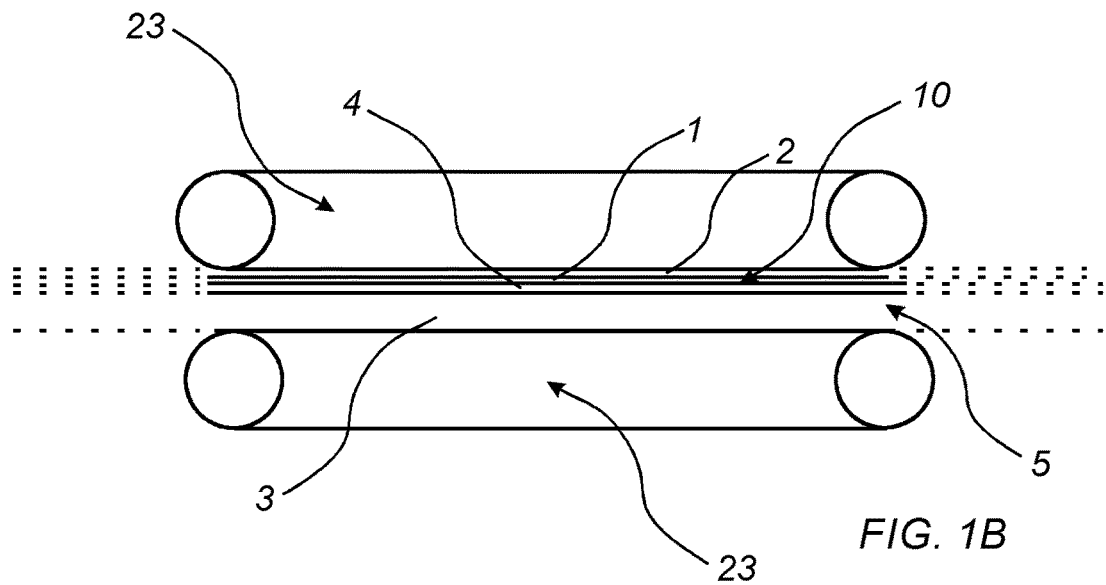
FIG. 1B shows a method to produce a building panel.

In FIG. 1B, the coated carrier 10 formed as described above with reference to FIG. 1A is intended to form part of a building panel 5. The building panel 5 may be a floor panel, a wall panel, a ceiling panel, a furniture component, etc. For example, the building panel may be of the type being known as LVT or WPC.

In the embodiment shown in FIG. 1B, the coated carrier 10 forms a coated wear resistant foil in the building panel 5. In the embodiment shown in FIGS. 1B, the coated wear resistant foil comprises a thermoplastic material. The thermoplastic material may be polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt. Preferably, the coating layer of the coated carrier 10 comprises wear and/or scratch resistant particles of the type described above, preferably scratch resistant particles of the type described.

In FIG. 1B, a substrate 3 is provided. The substrate may comprise a thermoplastic material. The substrate 3 may comprise a thermoplastic material and fillers, such as a WPC (Wood Plastic Composite), Expanded Polymer Core (EPC), Stone Plastic Composite (SPC), or Solid Polymer Core (SPC), or any other type of a polymer core comprising fillers and a thermoplastic material. The core may be extruded or calendered. The thermoplastic material may comprise polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt.

In other embodiments, the substrate 3 may comprise a wood-based substrate, such as a wood veneer or may be or comprise a wood fibre based board, such as MDF, HDF, particleboard etc., or a plywood board. In other embodiments, the substrate may comprise a paper, such as a decorative paper. In other embodiments, the substrate may be formed of a dry powder mix comprising a binder and filler being pressed into a surface layer.

In the embodiment shown in FIG. 1B, a decorative layer 4 is provided and arranged on a surface of the substrate 3. It is also contemplated that the substrate 3 is provided with a decorative design, such as a print. In such an embodiment, the coated carrier 10 is arranged directly on a surface of the substrate 3 (not shown). It is also contemplated that the thermoplastic foil forming the carrier 1 of the coated carrier 10 is provided with a decorative design, such as a print. In such an embodiment, the coated carrier 10 is arranged directly on a surface of the substrate 3 (not shown).

The decorative layer 4 may comprise a thermoplastic material. The thermoplastic material may be polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt. The decorative layer may be provided with a decorative design, such as a print.

In other embodiments, the decorative layer 4 may comprise a wood veneer, or a paper, such as a decorative paper.

The coated carrier 10 is arranged on the decorative layer 4. In alternative embodiment, the coating layer may be released from the carrier 1 in form of a release foil, and subsequently be arranged directly on the decorative layer 4, or on the substrate 3.

In embodiments, an adhesive may be provided between the decorative layer 4 and the substrate 3.

The substrate 3, the decorative layer 4, and the coated carrier 10 with the cured coating layer 2 are thereafter pressed together in pressing device 23 such that the layers are adhered to each other and a building panel 5 is formed. The pressing device 23 may be static or continuous. Preferably, heat is also applied during pressing. The pressure applied may be 5-100 bar, applied for example during 5-500 seconds. The temperature may be 80-300° C., such as 100-250° C., such as 120-180° C., such as 130-150° C. The temperature may be about 140° C.

The pressing device 23 may have different gloss levels. A press surface of the pressing device 23 may have portions having high gloss, or even super high gloss levels and portions being matt. The different gloss levels are provided with micro embossings or a micros structure having a maximum depth of 30 µm. The higher depth of the micro structure, the more the portion or portions having a matt texture. The lower depth of the micro structure, the more glossy portion or portions. When pressing the coated carrier 10 against the micro structure, the coated carrier 10 obtains portions having different gloss levels. The depth of the micro embossing may vary over the surface of the pressing device 23 such that a varying gloss levels are obtained. When pressing the coated carrier 10 against the micro structure, the coated carrier 10 obtains portions having different gloss levels, corresponding to the gloss levels of the press surface of the pressing device 23. The gloss levels may be varying over the surface of the coated carrier 10. By different gloss levels is preferably meant that the gloss level of a first portion, or a first set of portions, differs from the gloss level of a second portion, or a second set of portions. The first portion, or the first set of portions, may have a higher gloss level than the second portion, or the second set of portions. The first portion, or first set of portions, may have a first degree of gloss, and the second portion, or second set of portions, may have a second degree of gloss, being higher or lower than first degree of gloss.

The pressing device 23 may also be provided with protrusions for forming macro embossings or a macro structure in the coating layer of the coated carrier. The macro structure may also be in register with the decorative print or printed design of the decorative layer.

The pressing device 23 may comprise a metal surface provided with the different gloss levels as described above. The metal surface of the pressing device is adapted to directly contact the coating layer 2 of the coated carrier 10. The pressing device 23 may be a pressing cylinder or pressing plate provided with the different gloss levels, wherein the pressing cylinder or pressing plate directly contacts the surface of the coated carrier 10.

In one embodiment, the pressing device 23 may comprise a structure foil provided with different gloss levels. The structure foil is adapted to directly contact the surface of the coated carrier. The structure foil may be arranged between the coated carrier and a press plate, press belt or press cylinder during pressing.

The surface of the coated carrier 10 may be provided with a release agent in order to prevent that the coated carrier sticks to the pressing device during pressing at elevated pressing temperature. Since no additional layer is to be applied on the coated carrier 10, a release agent can be applied on the coated carrier 10, thereby facilitating the pressing operation.

After pressing, the coated carrier 10 may have portions with different gloss levels. The different gloss levels are formed by a micro structure in the coating layer, preferably having a maximum depth of 30 µm. The different gloss levels may be formed in register with the decorative pattern or printed design of the decorative layer 4.

The coating layer of the coated carrier 10 may also be provided with embossed portions during pressing. The pressing device 23, such as the press plate, the press cylinder, the press belt or structure foil may be provided with protrusions forming embossing or macro structure in the coating layer of the coated carrier 10. Alternatively, the embossed portions may be formed in a separate step from forming the portions having different gloss levels. The embossing is preferably in register with the decorative pattern or printed design. The embossing is preferably coordinated with the portions having different gloss levels of the coated carrier 10. The embossed portions in the wear resistant layer, preferably have a depth exceeding 100 µm.

By pressing the coated carrier 10 to the substrate 3, with an optional intermediate decorative layer 4, a building panel 5 is formed.

Figure 1C:
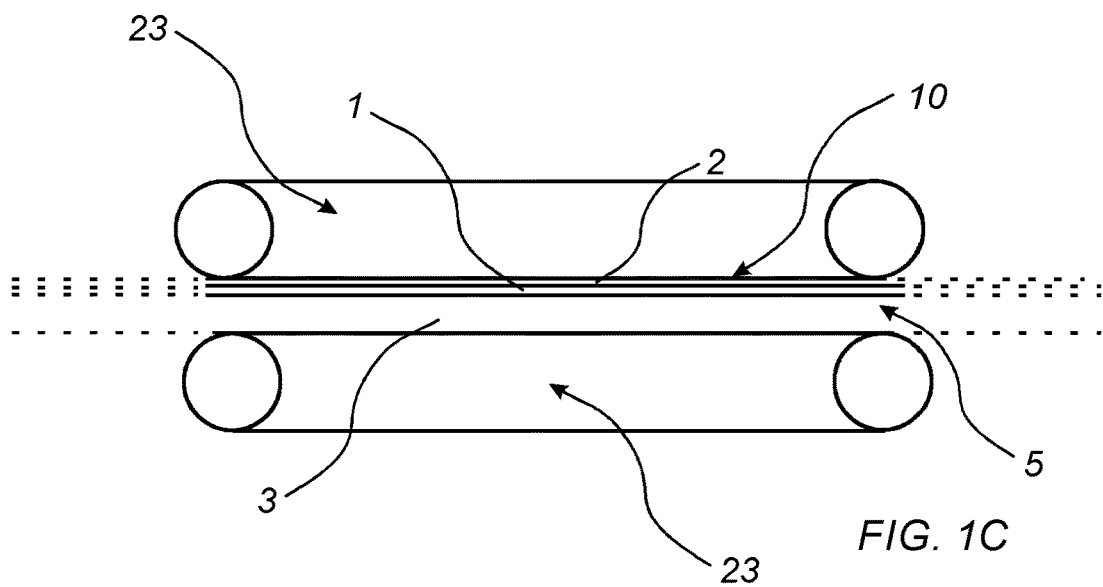
FIG. 1C shows a method to produce a building panel.

In FIG. 1C, the coated carrier 10 formed as described above with reference to FIG. 1A is intended to form part of a building panel 5. The building panel 5 may be a floor panel, a wall panel, a ceiling panel, a furniture component, etc.

In the embodiment described with reference to FIG. 1C, the carrier 1 is a wood veneer layer. The wood veneer layer may have a thickness of about 0.2 to 1 mm. The veneer may be made of any type of veneer. In one embodiment, the wood veneer layer is an oak veneer layer. Consequently, a coated wood veneer layer 10 is formed by the process described above with reference to FIG. 1A.

In the embodiment shown in FIG. 1C, the coated wood veneer layer 10 forms a surface of a building panel 5. In FIG. 1C, the coated wood veneer layer 10 is arranged on a substrate 3, and adhered to the substrate 3. The substrate 3 may be a wood-based board. The wood-based board may be a wood fibre based board, such as MDF, HDF, particleboard etc., or a plywood board. The substrate 3 may be a wooden board, such as a lamella core. In other embodiments, the substrate may be a thermoplastic board, for example a Wood Plastic Composite (WPC), Expanded Polymer Core (EPC), Stone Plastic Composite (SPC), or Solid Polymer Core (SPC). The substrate 3 may be a mineral composite board. The substrate may be a fibre cement board. The substrate 3 may be magnesium oxide cement board. The substrate may be a ceramic board. The substrate 3 may be a plastic board, such as a thermoplastic board. In other embodiments, the substrate 3 may be a carrier, such as sheet of paper or non-woven. The wood-based substrate 3 may be printed, preferably by digital printer.

The coated wood veneer layer 10 with the cured coating layer 2 is pressed in a pressing device 23, preferably simultaneously as being adhered to the substrate. The coated wood veneer layer 10 may be adhered to the substrate 3 under pressure. An adhesive layer may be applied on the coated wood veneer layer 10 and/or the substrate 3. The adhesive layer may comprise a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The adhesive layer may comprise a hot melt or pressure sensitive adhesive.

The pressing device 23 may be static or continuous. Preferably, heat is also applied. The pressure applied may be 5-100 bar, applied for example during 5-500 seconds. The temperature may be 80-300° C., such as 100-250° C., such as 120-180° C., such as 130-150° C. The temperature may be about 140° C.

The pressing device 23 may have different gloss levels. A press surface of the pressing device 23 may have portions having high gloss, or even super high gloss levels and portions being matt. The different gloss levels are provided with micro embossings or a micros structure having a maximum depth of 30 µm. The higher depth of the micro structure, the more the portion or portions having a matt texture. The lower depth of the micro structure, the more glossy portion or portions. When pressing the coated wood veneer layer 10 against the micro structure, the coated wood veneer layer 10 obtains portions having different gloss levels. The depth of the micro embossing may vary over the surface of the pressing device 23 such that a varying gloss levels are obtained. When pressing the coated wood veneer layer 10 against the micro structure, the coated wood veneer layer 10 obtains portions having different gloss levels, corresponding to the gloss levels of the press surface of the pressing device 23. The gloss levels may be varying over the surface of the coated wood veneer layer 10. By different gloss levels is preferably meant that the gloss level of a first portion, or a first set of portions, differs from the gloss level of a second portion, or a second set of portions. The first portion, or the first set of portions, may have a higher gloss level than the second portion, or the second set of portions. The first portion, or first set of portions, may have a first degree of gloss, and the second portion, or second set of portions, may have a second degree of gloss, being higher or lower than first degree of gloss.

The pressing device 23 may also be provided with protrusions for forming macro embossings or a macro structure of the coating layer of the coated wood veneer layer 10. The macro structure may also be in register with the wood pattern of the coated wood veneer layer 10.

The pressing device 23 may comprise a metal surface provided with the different gloss levels as described above. The metal surface of the pressing device 23 is adapted to directly contact the surface of the coated carrier. The pressing device 23 may be a pressing cylinder or pressing plate provided with the different gloss levels, wherein the pressing cylinder or pressing plate directly contacts the surface of the coated carrier.

In one embodiment, the pressing device 23 may comprise a structure foil provided with different gloss levels. The structure foil is adapted to directly contact the surface of the coated wood veneer layer 10. The structure foil may be arranged between the coated wood veneer layer 10 and a press plate, press belt or press cylinder during pressing.

The surface of the coated wood veneer layer 10 may be provided with a release agent in order to avoid that the coated carrier sticks to the pressing device 23. Since no additional layer is to be applied on the coated wood veneer layer 10, a release agent can be applied on the coated wood veneer layer 10, thereby facilitating the pressing operation.

After pressing, the coated wood veneer layer 10 may have portions with different gloss levels. The different gloss levels are formed by a micro structure in the surface, preferably having a maximum depth of 30 µm. The different gloss levels may be formed in register with the wood pattern of the coated wood veneer layer 10.

The surface of the coated wood veneer layer 10 may also be provided with embossed portions during pressing. The pressing device 23, such as the press plate, the press cylinder, the press belt or structure foil may be provided with protrusions forming embossing or macro structure in the coated wood veneer layer 10. Alternatively, the embossed portions may be formed in a separate step from forming the portions having different gloss levels. The embossing is preferably in register with the wood pattern. The embossing is preferably coordinated with the portions having different gloss levels of the coated wood veneer layer 10. The embossed portions in the wear resistant layer, preferably have a depth exceeding 100 µm.

Thereby, a building panel 5 is formed, comprising the coated wood veneer layer 10 adhered to the substrate 3.

In the embodiment described with reference to FIG. 1C, as alternative to a wood veneer layer, the carrier 1 may comprise a paper, such as a decorative paper.

Figure 2:
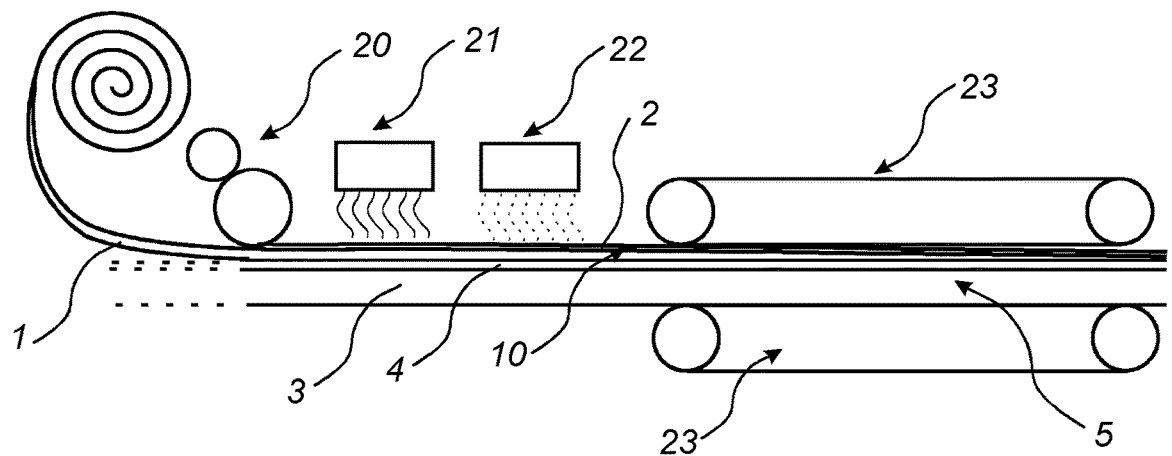
FIG. 2 shows a method to produce a building panel.

In FIG. 2, an integrated method of forming a coated building panel 5 is shown. In FIG. 2, a substrate 3 and at least one surface layer is provided. In the embodiment shown in FIG. 2, the surface layer comprises a decorative layer 4 and a carrier 1.

The substrate 3 may comprise a thermoplastic material. The substrate 3 may comprise a thermoplastic material and fillers, such as WPC (Wood Plastic Composite), EPC (Expanded Polymer Core), or SPC (Stone Plastic Composite/Solid Polymer Core), or any other type of a polymer core comprising fillers and a thermoplastic material. The substrate may be extruded or calendered. The thermoplastic material of may comprise polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt.

In one embodiment, the substrate 3 may comprise a wood-based board. The wood-based board may be a wood fibre based board, such as MDF, HDF, particleboard, etc., or a plywood board. The substrate 3 may be a wooden board, such as a lamella core. In other embodiments, the substrate 3 may be a thermoplastic board, for example a Wood Plastic Composite (WPC), EPC (Expanded Polymer Core), or SPC (Stone Plastic Composite/Solid Polymer Core). The substrate 3 may be a mineral composite board. The substrate 3 may be a fibre cement board. The substrate 3 may be a magnesium oxide cement board. The substrate 3 may be a ceramic board. The substrate 3 may be a plastic board, such as a thermoplastic board. In other embodiments, the substrate 3 may be a carrier, such as sheet of paper or non-woven.

The decorative layer 4 may comprise a thermoplastic material. The thermoplastic material may be polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt. The decorative layer may be provided with a decorative design, such as a print.

In other embodiments, the decorative layer 4 may comprise a wood veneer, or a paper, such as a decorative paper. It is also contemplated that the substrate 3 is provided with a decorative design, such as a print. In such an embodiment, the carrier 1 is arranged directly on a surface of the substrate 3. It is also contemplated that the carrier 1 of the coated carrier 10 is provided with a decorative design, such as a print. In such an embodiment, the carrier 1 is arranged directly on a surface of the substrate 3.

The carrier 1 may be a thermoplastic foil. The thermoplastic foil may comprise, for example, polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt. The carrier 1 may have thickness of 0.05-1 mm. The thermoplastic foil may be printed and/or pigmented such that the thermoplastic foil forms a decorative foil.

A coating composition is applied on a surface of the carrier 1 by a coating device 20. The coating composition may be that being traditionally referred to as a lacquer. The coating composition may be applied by roller coating, curtain coating, dip coating, spraying, etc.

The coating composition is cross-linkable. The coating composition may be radiation curable, preferably UV curable. The coating composition is preferably water-based, such as a UV curable water-based composition. The water-based UV curable composition may comprise a polyester/polyurethane dispersion. The water-based UV curable composition may comprise a polyurethane/acrylic copolymer dispersion. The water-based UV-curable composition may further comprise a photoinitiator, thickener agent, additives etc.

The coating composition may be a two-component system, such as an epoxy amine system, polyurethane isocyanate system, isocyanate alcohol system, acid alcohol system, etc.

The coating composition may be applied in one or several layers. The total amount of the coating composition applied, converted to the amount corresponding to 100% coating component and 0% water and solvent, may be 5-200 g/m2, such as exceeding 5 g/m2, preferably exceeding 10 g/m2.

The coating composition may comprise wear resistant particles and/or scratch resistant particles. Preferably, the coating composition comprises scratch resistant particles. Alternatively, or as a complement, scratch resistant particles may be applied on the coating composition applied on the carrier when the coating composition still is wet.

The wear resistant particles may be aluminium oxide particles, such as corundum. Alternatively, or as a complement, the wear resistant particles may be carborundum, quartz, silica, glass, glass beads, glass spheres, diamond particles, hard plastics, reinforced polymers and organics, or a combination thereof.

The wear resistant particles preferably have an average particle size within the range of 10-200 μm, preferably within the range of 50-120 μm, such as 50-100 am. The wear resistant particles may have a spherical shape or an irregular shape. The wear resistant particles may be surface treated. The wear resistant particles may be silane-treated particles. The wear resistant particles may be applied in an amount of 10-100 g/m2, preferably in an amount of 10-50 g/m2, more preferably in an amount of 20-30 g/m2.

The scratch resistant particles may be or comprise nano-sized silica particles, preferably fused silica particles. The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-100 μm, preferably 10-50 μm, more preferably 20-30 μm. The scratch resistant particles may have an average particle size of less than 50 μm, preferably less than 45 μm. The scratch resistant particles may be applied in an amount of 0.5-20 g/m2, preferably in an amount of 0.5-10 g/m2, more preferably in an amount of 0.5-5 g/m2.

The coating composition may comprise conventional additives. The coating composition may further comprise may be functional additives, such as anti-stat additives and/or anti-bacterial additives.

The coating composition may be transparent. However, the coating composition may also be pigmented.

The coating composition may be applied as one or several layers on the carrier 1.

After the coating composition has been applied on the carrier 1, the coating composition is cured such that a coating layer 2 is formed. If the coating composition is UV curable, UV radiation is applied to cure the coating composition. If the coating composition is water-based UV curable coating composition, the coating composition is first dried in a drying device 21 by IR or in an oven and thereafter is cured by applying UV radiation to the coating composition in UV radiation device 22. If the coating composition is a two-component system, the coating composition is dried, for example, in an oven or in room temperature.

After curing, a coated carrier 10 is formed.

Preferably, some crosslinking capacity of the coating composition remains after curing. The coating composition may have a residual oligomer content of less than 10% after curing. Having some residual oligomer content corresponds with having some remaining crosslinking capacity. Thereby, during pressing in a subsequent step, the coating composition may be further crosslinked.

In the embodiment shown in FIG. 2, the substrate, the decorative layer 4 and the coated carrier 10 with the cured coating layer 2 are pressed together in line with the coating step in a pressing device 23. Preferably, the pressing device 23 is continuous. Preferably, heat is also applied. The pressure applied may be 5-100 bar, applied for example during 5-500 seconds. The temperature may be 80-300° C., such as 100-250° C., such as 120-180° C., such as 130-150° C. The temperature may be about 140° C.

The pressing device 23 may have different gloss levels. A press surface of the pressing device 23 may have portions having high gloss, or even super high gloss levels and portions being matt. The different gloss levels are provided with micro embossings or a micros structure having a maximum depth of 30 µm. The higher depth of the micro structure, the more the portion or portions having a matt texture. The lower depth of the micro structure, the more glossy portion or portions. When pressing the coating layer 2 against the micro structure, the coating layer 2 obtains portions having different gloss levels. The depth of the micro embossing may vary over the surface of the pressing device 23 such that a varying gloss levels are obtained. When pressing the coating layer 2 against the micro structure, the coating layer 2 obtains portions having different gloss levels, corresponding to the gloss levels of the press surface of the pressing device 23. The gloss levels may be varying over the surface of the coating layer 2. By different gloss levels is preferably meant that the gloss level of a first portion, or a first set of portions, differs from the gloss level of a second portion, or a second set of portions. The first portion, or the first set of portions, may have a higher gloss level than the second portion, or the second set of portions. The first portion, or first set of portions, may have a first degree of gloss, and the second portion, or second set of portions, may have a second degree of gloss, being higher or lower than first degree of gloss.

The pressing device 23 may also be provided with protrusions for forming macro embossings or a macro structure of the surface of the coated carrier 10. The macro structure may also be in register with the decorative print or printed design of the decorative layer 4.

The pressing device 23 may comprise a metal surface provided with the different gloss levels as described above. The metal surface of the pressing device 23 is adapted to directly contact the surface of the coating layer 2. The pressing device 23 may be a pressing cylinder or pressing plate provided with the different gloss levels, wherein the pressing cylinder or pressing plate directly contacts the surface of the coated carrier 10.

In one embodiment, the pressing device 23 may comprise a structure foil provided with different gloss levels. The structure foil is adapted to directly contact the surface of the coating layer 2. The structure foil may be arranged between the coating layer 2 and a press plate, press belt or press cylinder during pressing.

The coating layer 2 may be provided with a release agent in order to avoid that the coating layer 2 sticks to the pressing device. Since no additional layer is to be applied on the coating layer 2, a release agent can be applied on the coating layer 2, thereby facilitating the pressing operation.

After pressing, the coating layer 2 may have portions with different gloss levels. The different gloss levels are formed by a micro structure in the surface, preferably having a maximum depth of 30 µm. The different gloss levels may be formed in register with the decorative pattern or printed design of the decorative layer.

The coating layer 2 may also be provided with embossed portions during pressing. The pressing device 23, such as the press plate, the press cylinder, the press belt or structure foil, may be provided with protrusions forming embossing or macro structure in the coating layer 2. Alternatively, the embossed portions may be formed in a separate step from forming the portions having different gloss levels. The embossing is preferably in register with the decorative pattern or printed design. The embossing is preferably coordinated with the portions having different gloss levels of the coated carrier. The embossed portions in the wear resistant layer, preferably have a depth exceeding 100 µm.

By pressing the coated carrier 10 to the substrate 3, with an optional intermediate decorative layer 4, a building panel 5 is formed.

Figure 3:
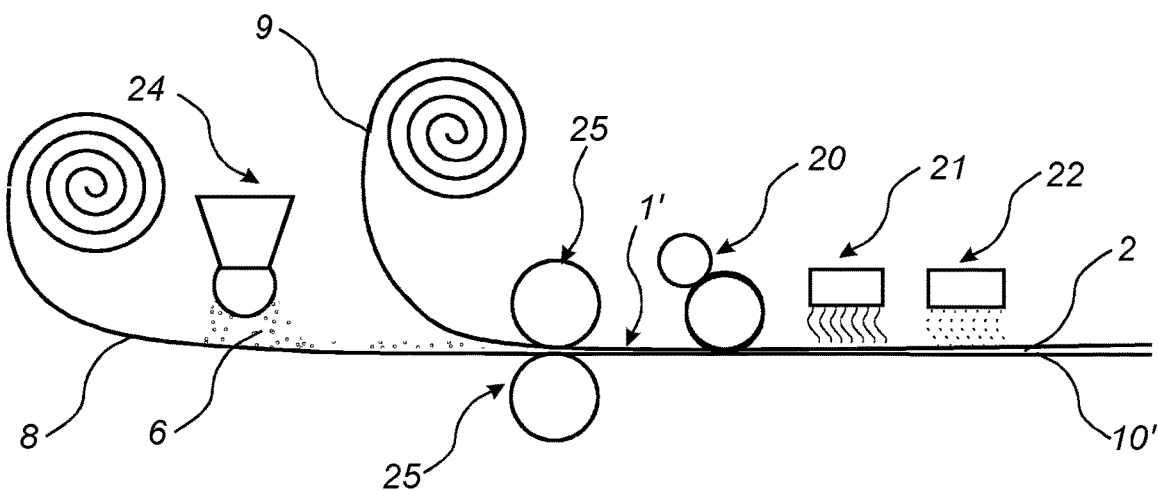
FIG. 3 shows a method to produce a coated foil.

In FIG. 3, an alternative method of forming a coated foil 10' is shown. The coated foil 10' comprises in this embodiment a first foil 8 and a second foil 9.

The first foil 8 comprises a first thermoplastic material. The first thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Preferably, the first foil 8 is formed of the thermoplastic material. The first foil 8 may substantially consist of the thermoplastic material, and optionally additives. Additives may be plasticizers, stabilizers, lubricants, degassing agents, coupling agents, compatibilizers, crosslinking agents, etc.

In one embodiment, the first foil 1 is a PVC foil.

The first foil 8 may have a thickness of 0.1-1 mm. Preferably, the first foil 8 has a thickness less than 0.5 mm, more preferably about 100 µm, preferably as measured in the final product, for example, after pressing. The first foil 8 may be a decorative foil.

Wear resistant particles 6 may be applied on the first foil 8 by a scattering device 24. The wear resistant particles may be aluminium oxide particles, such as corundum. Alternatively, or as a complement, the wear resistant particles 6 may be carborundum, quartz, silica, glass, glass beads, glass spheres, diamond particles, hard plastics, reinforced polymers and organics, or a combination thereof.

The wear resistant particles 6 preferably have an average particle size within the range of 10-200 µm, preferably within the range of 50-120 µm, such as 50-100 am. The wear resistant particles 6 may have an average particle size of less than 50 µm, preferably less than 45 µm. The wear resistant particles 6 may have a spherical shape or an irregular shape. The wear resistant particles 6 may be surface treated. The wear resistant particles 6 may be silane-treated particles.

The wear resistant particles 6 may have a refractive index similar to the refractive index of the second foil. The wear resistant particles 6 may have a refractive index of 1.4-1.9. In one embodiment, the wear resistant particle may have a refractive index of 1.4-1.9, preferably 1.5-1.8, for example, 1.7-1.8. In an embodiment, the refractive index of the wear resistant particles 6 may not differ from the refractive index of the second foil more than ±20%.

The wear resistant particles 6 may be applied in an amount of 10-100 g/m2, preferably in an amount of 10-50 g/m2, more preferably in an amount of 20-30 g/m2. After the wear resistant particles 6 have been applied on the first foil 8, a second foil 9 is provided and arranged on the first foil 9. The wear resistant particles 6 are thereby encapsulated by the first foil 8 and the second foil 9.

As an alternative or complement to apply the wear resistant particles 6 on the first foil 8, the wear resistant particles may be applied on the second foil 9. In this embodiment, the second foil 9 with the wear resistant particles 6 is arranged on the first foil 8, or vice versa.

The second foil 9 comprises a second thermoplastic material. The second thermoplastic material may be the same as in the first foil 8, or being different from the thermoplastic material of the first foil 8. The second thermoplastic may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. Preferably, the second foil 9 is formed of the thermoplastic material. The second foil may substantially consist of the thermoplastic material, and optionally additives. Additives may be plasticizers, stabilizers, lubricants, degassing agents, coupling agents, compatibilizers, crosslinking agents, etc.

In one embodiment, the first foil 8 is a PVC foil and the second foil 9 is PU foil.

The second foil 9 may be provided as a foil produced in a separate production step. The second foil 9 may be provided as continuous web.

In other embodiments, the second foil 9 may be formed by an extrusion process, such as extrusion coating or extrusion lamination of the second foil 9 on the first foil 8.

The second foil 9 may have a thickness of 0.01-1 mm. Preferably, the second foil 9 has a thickness less than 0.5 mm, more preferably about 90-110 µm, e.g., 100 µm, preferably as measured in the final product, for example, after pressing. In an embodiment wherein the second foil is a PVC foil, the thickness may be about 100 µm. In an embodiment wherein the second foil is a PU foil, the thickness may be about 40-60 µm, e.g., 50 µm.

The first foil 8 may have a thickness exceeding the thickness of the second foil 9. Especially if the first foil 8 comprises PVC and the second foil 9 comprises PU, the first foil 8 may have a thickness exceeding the thickness of the second foil 9.

The wear resistant particles 6 may have an average particle size being less than the thickness of the second foil 9. However, the wear resistant particles 6 may have an average particle size being larger than the thickness of the second foil 9. During pressing, the wear resistant particles 6 are pressed into the first foil 8 such that the wear resistant particles do not protrude beyond an upper surface of the second foil 9 after pressing, although the wear resistant particles 6 have an average particle size exceeding the thickness of the second foil 9.

The first and the second foil 8, 9 are thereafter adhered to each other to form a wear resistant foil 1' comprising the first foil 8, the second foil 9, and wherein at least a part of the wear resistant particles are arranged between the first foil and the second foil.

The wear resistant foil 1' is preferably transparent, or at least substantially transparent.

The first and the second foil 8, 9 may be adhered to each other by being pressed together, for example, in a calendering/laminating process. As shown in FIG. 3, the first and the second foil 8, 9 are pressed in a continuous press 25. The first and second foil 8, 9 may be adhered together by pressure alone, by heat and pressure, by pressure and adhesive, or by heat, pressure, and adhesive. Preferably, both pressure and heat are applied in order to adhere the first and the second foil to each other. As alternative or complements to a calendering process, a continuous or static press may also be used. The pressing operation may, for example, be a hot-hot process, a hot-cold process, etc. The pressing may be made with an embossed press matrix or press roller, such that an embossed structure is formed in the wear resistant foil 1'.

Depending on the thermoplastic materials and process used, the pressure applied may be 5-100 bar, applied, for example, during 5-500 seconds. The temperature may be 80-300° C., such as 100-250° C., such as 120-180° C., such as 130-150° C. The temperature may be about 140° C.

After adhering, for example, by pressing, the layers to each other, the wear resistant particles 6 are enclosed by the first and the second foil 8, 9. Preferably, the wear resistant particles are completely enclosed by the first and the second foils 8, 9. Preferably, the wear resistant particles do not protrude beyond the surface of the second foil 9 facing away from the first foil 8. Thereby, a wear resistant foil 1' having a smooth surface can be formed.

As described above with reference to FIG. 1A, the wear resistant foil 1' forming a carrier, formed by the first and second foil 8, 9 is coated by a coating composition being applied on a surface of the second foil 9. The coating composition may be that being traditionally referred to as a lacquer. The coating composition may be applied by roller coating, curtain coating, dip coating, spraying, etc.

The coating composition is cross-linkable. The coating composition may be radiation curable, preferably UV curable. The coating composition is preferably water-based, such as a UV curable water-based composition. The water-based UV curable composition may comprise a polyester/polyurethane dispersion. The water-based UV curable composition may comprise a polyurethane/acrylic copolymer dispersion. The water-based UV-curable composition may further comprise a photoinitiator, thickener agent, additives etc.

The coating composition may be a two-component system, such as an epoxy amine system, polyurethane isocyanate system, isocyanate alcohol system, acid alcohol system, etc.

The coating composition may be applied in one or several layers. The total amount of the coating composition applied, converted to the amount corresponding to 100% coating component and 0% solvent, may be 5-200 g/m2, such as exceeding 5 g/m2, preferably exceeding 10 g/m2.

The coating composition may comprise wear resistant particles and/or scratch resistant particles. Preferably, the coating composition comprises scratch resistant particles. Alternatively, or as a complement, scratch resistant particles may be applied on the coating composition applied on the carrier when the coating composition still is wet.

The scratch resistant particles may be or comprise nano-sized silica particles, preferably fused silica particles. The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-100 μm, preferably 10-50 μm, more preferably 20-30 μm. The scratch resistant particles may have an average particle size of less than 50 μm, preferably less than 45 μm. The scratch resistant particles may be applied in an amount of 0.5-20 g/m2, preferably in an amount of 0.5-10 g/m2, more preferably in an amount of 0.5-5 g/m2.

The coating composition may comprise conventional additives. The coating composition may further comprise functional additives, such as anti-stat additives and/or anti-bacterial additives.

The coating composition may be transparent. However, the coating composition may also be pigmented.

The coating composition may be applied as one or several layers on the second foil 9.

After the coating composition has been applied on the carrier 1', the coating composition is cured such that a coating layer 2 is formed. If the coating composition is UV curable, UV radiation is applied to cure the coating composition. If the coating composition is water-based UV curable coating composition, the coating composition is first dried in a drying device 21 by IR or in an oven and thereafter is cured by applying UV radiation 22 to the coating composition in a UV radiation device 22. If the coating composition is a two-component system, the coating composition is dried, for example, in an oven or in room temperature.

After curing, a coated foil 10' is formed.

Preferably, some crosslinking capacity of the coating composition remains after curing. The coating composition may have a residual oligomer content of less than 10% after curing. Thereby, during pressing in a subsequent step, the coating composition may be further crosslinked.

In one embodiment, the second foil 9 is coated in the above described way before the first and second foil 8, 9 are adhered to each other, preferably by pressing.

The coated foil 10' formed by the method described with reference to FIG. 3 may be stored after the coating composition has been cured. The coated foil 10' may be applied to a substrate 3, with an optional decorative layer 4, as previously described with reference to FIG. 1B. The coated foil 10' may be intended to be used as coated wear resistant foil. In one embodiment, wherein the carrier is decorative thermoplastic foil, the coated carrier may be a coated decorative foil.

It is contemplated that there are numerous modifications of the embodiments described herein, which are still within the scope of the invention as defined by the appended claims. For example, it is contemplated that more than one wear resistant foil may be arranged on a core for forming a building panel. It is also contemplated that an additional coating layer or layers may be applied after pressing to the pressed coating layer.

It is also contemplated that a building panel being already formed may be coated by the above described method. In this embodiment, the carrier forms part of a building panel when the coating composition is applied on the carrier. After the coating composition is applied, the coating composition is cured to a coating layer and thereafter pressed as described above.

An exemplary UV curable water-based composition may include:
- UV curable composition may be 60 to 90 wt % of the composition, for example, 70 to 85 wt %;
- Photoinitiator may be 0.1 to 5 wt % of the composition, for example, 0.5 to 2.5 wt %;
- Water may be 1 to 25 wt % of the composition, for example, 5 to 15 wt %;
- Solvent may be 0.1 to 10 wt % of the composition, for example, 0.5 to 10 wt %;
- Thickener may optionally be used, and may be 0.0 to 15 wt % of the composition, for example, 0.1 to 10 wt %;
- Wear resistant particles may optionally be used, and may be 0.0 to 15 wt % of the composition, for example, 0.1 to 10 wt;
- Matting agent may optionally be used, and may be 0.0 to 15 wt % of the composition, for example, 0.1 to 10 wt %;
- Additive (e.g., defoamer/wetting agent) may optionally be used, and may be 0.0 to 15 wt % of the composition, for example, 0.1 to 10 wt %.

An exemplary solvent may be dipropylene glycol methyl ether.

EXAMPLES

Example 1: Lacquered PVC Foil on PVC Foil with Wear Resistant Particles

A first PVC wear layer foil with a thickness of 0.1 mm, was positioned on a decorative PVC foil with a thickness of 0.03 mm. On the first wear layer foil 25 g/m2 Al2O3 particles were applied using a scattering device. A second PVC wear layer foil with a thickness of 0.1 mm, was lacquered with 60 g/m2 UV curable water-based coating composition according to Table 1, dried in 50° C. oven for 10 minutes and then UV cured. The second PVC wear layer foil was positioned on the first wear layer foil with the Al2O3 particles. The decorative foil, the first wear layer foil and the second wear layer foils were laminated on to a PVC core material using a temperature of 140° C., a pressure of 10 bars and a pressing time of 60 seconds. The resulting product was found to have improved scratch resistance and chemical resistance. The resulting product was found to have a wear resistance higher than 5000 revolutions as tested in a Taber abrader in accordance with the test method in EN13329.

TABLE 1

| UV curable water-based composition | |
|---|---|
| UV-curable Polyester/Polyurethane Dispersion | 56.9 wt % |
| UV-curable Polyurethane/Acrylic Copolymer Dispersion | 22.8 wt % |
| Photoinitiator | 1.1 wt % |
| Water | 8.7 wt % |
| Solvent (Dipropylene Glycol Methyl Ether) | 2.9 wt % |
| Thickener (PU) | 3.3 wt % |
| Al$_2$O$_3$ | 1.1 wt % |
| Matting agent (Silica) | 2.2 wt % |
| Additive (defoamer/wetting agent) silicon | 1 wt % |

Example 2: Lacquered PVC Foil on PVC Foil with Wear Resistant Particles being Pre-Pressed On a first PVC wear layer foil with a thickness of 0.1 mm, 25 g/m2 Al2O3 particles were applied using a scattering device. A second PVC wear layer foil with a thickness of 0.1 mm, was lacquered with 60 g/m2 UV curable water-based coating composition according to Table 1, dried in 50° C. oven for 10 minutes and then UV cured. The second PVC wear layer foil was positioned on the first wear layer foil with the Al2O3 particles. The first and the second wear layer foil were laminated using a temperature of 120° C., a pressure of 10 bars and a pressing time of 60 seconds in a first pressing step. The laminated wear layer was laminated on to a decorative PVC foil with a thickness of 0.03 mm and to a PVC core material using a temperature of 140° C., a pressure of 10 bars and a pressing time of 60 seconds in a second pressing step. The resulting product was found to have improved scratch resistance and chemical resistance. The resulting product was found to have a wear resistance higher than 5000 revolutions as tested in a Taber abrader in accordance with the test method in EN13329.

Example 3: Lacquered PVC Foil on PVC Foil being Pre-Pressed

A first PVC wear layer foil with a thickness of 0.1 mm. A second PVC wear layer foil with a thickness of 0.1 mm, was lacquered with 60 g/m2 UV curable water-based coating composition according to Table 1, dried in 50° C. oven for 10 minutes and then UV cured. The second PVC wear layer foil was positioned on top of the first PVC wear layer foil. The first and the second wear layer foils were laminated using a temperature of 120° C., a pressure of 10 bars and a pressing time of 60 seconds in a first pressing step. The laminated wear layer was laminated on to a PVC decorative foil with a thickness of 0.03 mm and a PVC core material using a temperature of 140° C., a pressure of 10 bars and a pressing time of 60 seconds in a second pressing step. The resulting product was found to have improved scratch resistance and chemical resistance. The resulting product was found to have a wear resistance higher than 1900 revolutions as tested in a Taber abrader in accordance with the test method in EN13329.

Example 4: Lacquered PVC Foil on PVC Foil

A first PVC wear layer foil with a thickness of 0.1 mm was positioned on a decorative PVC foil with a thickness of 0.03 mm. A second PVC wear layer foil with a thickness of 0.1 mm, was lacquered with 60 g/m2 UV curable water-based coating composition according to Table 1, dried in 50° C. oven for 10 minutes and then UV cured. The second PVC wear layer foil was positioned on top of the first PVC wear layer foil. The first and the second wear layer foils were laminated on to a PVC core material using a temperature of 140° C., a pressure of 10 bars and a pressing time of 60 seconds. The resulting product was found to have improved scratch resistance and chemical resistance. The resulting product was found to have a wear resistance higher than 1900 revolutions as tested in a Taber abrader in accordance with the test method in EN13329.

Example 5: Lacquered PU Foil on PVC Foil with Wear Resistant Particles

A PVC wear layer foil with a thickness of 0.1 mm was positioned on a decorative foil with a thickness of 0.03 mm. On the PVC wear layer foil 25 g/m2 Al2O3 particles were applied using a scattering device. A PU wear layer foil with a thickness of 0.05 mm, was lacquered with 60 g/m2 UV curable water-based coating composition according to Table 1, dried in 50° C. oven for 10 minutes and then UV cured. This PU wear layer foil was positioned on the PVC wear layer foil with the Al2O3 particles. The PU wear layer foil and the PVC wear layer foil were laminated on to a PVC core material using a temperature of 140° C., a pressure of 10 bars and a pressing time of 60 seconds. The resulting product was found to have improved scratch resistance and chemical resistance. The resulting product was found to have a wear resistance higher than 5000 revolutions as tested in a Taber abrader in accordance with the test method in EN13329.

Example 6: Lacquered PU Foil on PVC Foil with Abrasive Particles being Pre-Pressed On a PVC wear layer foil with a thickness of 0.1 mm 25 g/m2 Al2O3 particles was applied using a scattering device. A PU wear layer foil with a thickness of 0.05 mm, was lacquered with 60 g/m2 UV curable water-based coating composition according to Table 1, dried in 50° C. oven for 10 minutes and then UV cured. This PU wear layer foil was positioned on the PVC wear layer foil with the Al2O3 particles. The two foils were laminated using a temperature of 120° C., a pressure of 10 bars and a pressing time of 60 seconds in a first pressing step. The laminated wear layer was laminated on to a decorative PVC foil with a thickness of 0.03 mm and a PVC core material using a temperature of 140° C., a pressure of 10 bars and a pressing time of 60 seconds in a second pressing step. The resulting product was found to have improved scratch resistance and chemical resistance. The resulting product was found to have a wear resistance higher than 5000 revolutions as tested in a Taber abrader in accordance with the test method in EN13329.

Example 7: Lacquered PU Foil on PVC Foil being Pre-Pressed

A PVC wear layer foil with a thickness of 0.1 mm. A PU wear layer foil with a thickness of 0.05 mm, was lacquered with 60 g/m2 UV curable water-based coating composition according to Table 1, dried in 50° C. oven for 10 minutes and then UV cured. This PU wear layer foil was positioned on top of the PVC wear layer foil. The two foils were laminated using a temperature of 120° C., a pressure of 10 bars and a pressing time of 60 seconds in a first pressing step. The laminated wear layer was laminated on to a decorative PVC foil with a thickness of 0.03 mm and a PVC core material using a temperature of 140° C., a pressure of 10 bars and a pressing time of 60 seconds in a second pressing step. The resulting product was found to have improved scratch resistance and chemical resistance. The resulting product was found to have a wear resistance higher than 2100 revolutions as tested in a Taber abrader in accordance with the test method in EN13329.

Example 8: Lacquered PU Foil on PVC Foil

A PVC wear layer foil with a thickness of 0.1 mm was positioned on a decorative PVC foil with a thickness of 0.03 mm. A PU wear layer foil with a thickness of 0.05 mm, was lacquered with 60 g/m2 UV curable water-based coating composition according to Table 1, dried in 50° C. oven for 10 minutes and then UV cured. This PU wear layer foil was positioned on top of the PVC wear layer foil. The three foils were laminated on to a PVC core material using a temperature of 140° C., a pressure of 10 bars and a pressing time of 60 seconds. The resulting product was found to have improved scratch resistance and chemical resistance. The resulting product was found to have a wear resistance higher than 2100 revolutions as tested in a Taber abrader in accordance with the test method in EN13329.

Example 9: Lacquered PVC Wear Layer

A PVC wear layer was lacquered with 60 g/m2 UV curable water-based composition according to Table 1, dried in 50° C. oven for 10 minutes and then UV cured. The lacquered PVC wear layer was pressed using a temperature of 140° C., a pressure of 10 bars and a pressing time of 60 seconds. The lacquered wear layer was laminated on to a decorative PVC foil with a thickness of 0.03 mm and to a PVC core material using a temperature of 140° C., a pressure of 10 bars and a pressing time of 60 seconds in a second pressing step. The resulting product was found to have improved scratch resistance and chemical resistance. The resulting product was found to have a wear resistance higher than 5000 revolutions as tested in a Taber abrader in accordance with the test method in EN13329.

Example 10: Lacquered LVT with PVC Wear Layer

An LVT product comprising a PVC core material and a decorative PVC foil with a PVC wear layer on top, was lacquered with 60 g/m2 UV curable water-based composition according to Table 1, dried in 50° C. oven for 10 minutes and then UV cured. This lacquered LVT was pressed using a temperature of 140° C., a pressure of 10 bars and a pressing time of 60 seconds. The LVT product was found to have improved scratch resistance and chemical resistance. The LVT product was found to have a wear resistance higher than 5000 revolutions as tested in a Taber abrader in accordance with the test method in EN13329.

Example 11: Lacquered LVT with PU Wear Layer

An LVT product comprising a PVC core material and a decorative PVC foil product with a PU wear layer on top, was lacquered with 60 g/m2 UV curable water-based composition according to Table 1, dried in 50° C. oven for 10 minutes and then UV cured. This lacquered LVT was pressed using a temperature of 140° C., a pressure of 10 bars and a pressing time of 60 seconds. The LVT product was found to have improved scratch resistance and chemical resistance. The LVT product was found to have a wear resistance higher than 5000 revolutions as tested in a Taber abrader in accordance with the test method in EN13329.

Example 12: Lacquered PU Wear Layer on Veneer

A wood veneer layer having a thickness of 0.6 mm was adhered to a PVC core material by a PU powder. A first PU wear layer foil having a thickness of 0.05 mm was arranged on the wood veneer layer. On the first PU wear layer foil 25 g/m2 Al2O3 particles were applied using a scattering device. A second PU wear layer having a thickness of 0.05 mm was applied on the PU wear layer foil with the Al2O3 particles. The second PU wear layer foil was lacquered with 60 g/m2 UV curable water-based coating composition according to Table 1, dried in 50° C. oven for 10 minutes and then UV cured. The wood veneer layer, the first PU wear layer foil and the second lacquered PU wear layer foil were laminated to the PVC core material using a temperature of 140° C., a pressure of 10 bars and a pressing time of 60 seconds. The resulting product was found to have improved scratch resistance and chemical resistance. The resulting product was found to have a wear resistance higher than 2400 revolutions as tested in a Taber abrader in accordance with the test method in EN13329.

Example 13: Lacquered PVC Foil on PVC Foil

A first PVC wear layer foil with a thickness of 0.1 mm was positioned on a decorative PVC foil with a thickness of 0.03 mm. A second PVC wear layer foil with a 15 thickness of 0.1 mm, was lacquered with 60 g/m2 2-component (PU-isocyanate) water-based coating composition dried in 50° C. oven for 20 minutes and then in RT for 2 days. The second PVC wear layer foil was positioned on top of the first PVC wear layer foil. The first and the second wear layer foils were laminated on to a PVC core material using a temperature of 140° C., a pressure of 10 bars and a pressing time of 60 seconds. The resulting product was found to have improved scratch resistance and chemical resistance. The resulting product was found to have a wear resistance higher than 1900 revolutions as tested in a Taber abrader in accordance with the test method in EN13329.

Embodiments

1. A method to produce a coating layer (2), comprising
applying a water-based coating composition on a surface of a carrier (1; 1'),
curing the water-based coating composition to a coating layer (2),
subsequently applying pressure to the coating layer (2).
2. The method according to embodiment 1, wherein the carrier (1; 1') comprises a thermoplastic material.
3. The method according to embodiment 1 or 2, wherein applying pressure comprises pressing the coating composition against a pressing device (23) comprising portions having different gloss levels, such that the coating layer (2) obtains different gloss levels after pressing.
4. The method according to any one of embodiments 1-3, wherein applying pressure comprises applying heat and pressure simultaneously.
5. The method according to any one of embodiments 1-4, wherein the coating composition comprises a cross-linkable component.
6. The method according to any one of embodiments 1-5, wherein the coating composition is UV-curable.
7. The method according to any one of embodiments 1-5, wherein the coating composition comprises a two-component system.
8. The method according to any one of embodiments 1-7, wherein the carrier is a foil (1), preferably a thermoplastic foil.
9. The method according to any one of embodiments 1-8, wherein applying pressure to the coating composition comprises pressing and attaching the coating layer (2) on the carrier (1; 1') to a substrate (3), wherein the carrier (1; 1') is intermediate the coating layer (2) and the substrate (3).
10. The method according to any one of embodiments 1-8, further comprising releasing the coating layer (2) from the carrier (1; 1') prior to applying pressure, and wherein applying pressure to the coating layer (2) comprises pressing and attaching the coating layer (2) to a substrate (3).

11. The method according to any one of embodiments 1-10, wherein the coating composition comprises wear resistant particles and/or scratch resistant particles.

12. The method according to any one of embodiments 1-11, wherein the carrier (1') comprises a first thermoplastic foil (8) and a second thermoplastic foil (9), wherein wear resistant particles, preferably aluminium oxide particles, are arranged between the first and the second foil (8, 9).

13. The method according to any one of embodiments 1-12, wherein the coating layer (2) is substantially transparent.

14. A method to produce a coating layer (2), comprising
applying a coating composition on a surface of a carrier (1; 1'), wherein the carrier (1; 1') is a thermoplastic foil,
curing the coating composition to a coating layer (2),
subsequently applying pressure to the coating layer (2).

15. The method according to embodiment 14, wherein the coating composition is UV-curable, preferably a water-based UV curable coating composition.

16. A method to produce a building panel (5), comprising
providing a substrate (3) and at least one surface layer (1; 1', 4) arranged on the substrate (3),
applying a water-based coating composition on said at least one surface layer (1; 1', 4),
curing the water-based coating composition such that a coating layer (2) is formed on said at least one surface layer (4),
subsequently applying pressure to the coating layer (2) with a pressing device (23), and pressing the substrate (3) and the coated surface layer (1; 1', 4) together to form a building panel (5).

17. The method according to embodiment 16, wherein said at least one surface layer comprises a thermoplastic material.

18. The method according to embodiment 16 or 17, wherein applying pressure to the coating layer (2) with the pressing device comprises applying heat and pressure simultaneously.

19. The method according to any one of embodiments 16-18, wherein applying pressure to the coating layer (2) with the pressing device comprises bonding the substrate (3), said at least surface layer (1; 1'; 4) and the coating composition together.

20. The method according to any one of embodiments 16-19, wherein the pressing device (23) comprises portions having different gloss levels, such that the coated surface layer (1; 1', 4) obtains different gloss levels after pressing.

21. The method according to any one of embodiments 16-20, wherein the coating layer (2) is substantially transparent.

22. The method according to any one of embodiments 16-21, wherein the coating composition comprises a cross-linkable component.

23. The method according to any one of embodiments 16-22, wherein the coating composition is UV-curable.

24. The method according to any one of embodiments 16-22, wherein the coating composition comprises a two-component system.

25. A method to produce a coated foil (10'), comprising
providing a first thermoplastic foil (8) and a second thermoplastic foil (9),
applying wear resistant particles (6) on the first thermoplastic foil (8) or on a second thermoplastic foil (9),
applying the second thermoplastic foil (9) on the first thermoplastic foil 8( ) such that the wear resistant particles (6) are arranged between the first and second thermoplastic foil (8, 9),
applying a coating composition on the second thermoplastic foil (9),
curing the coating composition such that a coating layer (2) is formed, and
subsequently applying pressure to the coating layer (2).

26. A coated foil (10, 10'), comprising a carrier (1, 1') and a cured coating layer (2) arranged on a surface of the carrier (1, 1'), wherein the carrier (1, 1') comprises a thermoplastic material, wherein the cured coating layer (2) comprises an embossed structure and/or different gloss levels obtained by a pressing device (23) after curing the coating layer (2).

27. The coated foil according to embodiment 26, wherein the carrier comprises a first thermoplastic foil (8) and a second thermoplastic foil (9) with wear resistant particles (6) arranged therebetween.

28. The coated foil according to any one of embodiments 26-27, wherein the cured coating layer is cross-linked.

29. The coated foil according to any one of embodiments 26-28, wherein the cured coating layer (2) is UV-cured.

30. The coated foil according to any one of embodiments 26-28, wherein the coating layer comprises a two-component system.

31. A building panel (5), comprising
a substrate (3),
at least one surface layer (1; 1', 4) arranged on the substrate (3), wherein at least one surface layer (1; 1', 4) comprises a thermoplastic material, and
wherein an uppermost surface layer is provided with a cured coating layer (2), wherein the cured coating layer (2) comprises an embossed structure and/or different gloss levels obtained by a pressing device (23) after curing the coating layer (2).

32. The building panel according to embodiment 31, wherein said at least one surface layer (1; 1', 4) comprises at least one a thermoplastic foil.

33. The building panel according to embodiment 31 or 32, wherein the cured coating layer (2) is cross-linked.

34. The building panel according to any one of embodiments 31-33, wherein the cured coating layer (2) is UV cured.

35. The building panel according to any one of embodiments 31-33, wherein the coating layer comprises a two-component system.

The invention claimed is:

1. A method to produce a coating layer, comprising
applying a coating composition on a surface of a carrier,
curing the coating composition to a coating layer,
releasing the coating layer from the carrier prior to applying pressure, and
subsequently applying pressure to the coating layer,
wherein the coating layer comprises a residual oligomer content of more than 0 wt % and less than 10 wt % after curing.

2. The method according to claim 1, wherein the carrier comprises a thermoplastic material.

3. The method according to claim 1, wherein applying pressure comprises pressing the coating layer against a pressing device comprising portions having different gloss levels, wherein the coating layer obtains different gloss levels after pressing.

4. The method according to claim 1, wherein applying pressure comprises applying heat and pressure simultaneously.

5. The method according to claim 1, wherein the coating composition comprises a cross-linkable component.

6. The method according to claim 1, wherein the coating composition is UV-curable.

7. The method according to claim 1, wherein the coating composition comprises a two-component system.

8. The method according to claim 1, wherein the carrier is a foil.

9. The method according to claim 1, wherein applying pressure to the coating layer comprises pressing and attaching the coating layer on the carrier to a substrate, wherein the carrier is intermediate the coating layer and the substrate.

10. The method according to claim 1, wherein applying pressure to the coating layer comprises pressing and attaching the coating layer to a substrate.

11. The method according to claim 1, wherein the coating composition comprises wear resistant particles and/or scratch resistant particles.

12. The method according to claim 1, wherein the carrier comprises a first thermoplastic foil and a second thermoplastic foil, wherein wear resistant particles are arranged between the first and the second foil.

13. The method according to claim 1, wherein the coating layer is transparent.

14. The method according to claim 1, wherein the residual oligomer content corresponds with having remaining cross-linking capacity.

15. A method to produce a building panel, comprising
providing a substrate and at least one surface layer arranged on the substrate,
applying a coating composition on said at least one surface layer,
curing the coating composition wherein a coating layer is formed on said at least one surface layer,
subsequently applying pressure to the coating layer with a pressing device, and pressing the substrate and the coated surface layer together to form a building panel,
wherein the pressing device comprises portions having different gloss levels, wherein the coating layer obtains different gloss levels after pressing,
wherein the coating layer comprises a residual oligomer content of more than 0 wt % and less than 10 wt % after curing.

16. The method according to claim 15, wherein said at least one surface layer comprises a thermoplastic material.

17. The method according to claim 15, wherein applying pressure to the coating layer with the pressing device comprises applying heat and pressure simultaneously.

18. The method according to claim 15, wherein applying pressure to the coating layer with the pressing device comprises bonding the substrate, said at least surface layer and the coating layer together.

19. The method according to claim 15, wherein the coating layer is transparent.

20. The method according to claim 15, wherein the coating composition comprises a cross-linkable component.

21. The method according to claim 15, wherein the coating composition is UV-curable.

22. The method according to claim 15, wherein the coating composition comprises a two-component system.

23. The method according to claim 15, wherein the residual oligomer content corresponds with having remaining crosslinking capacity.

* * * * *